US011306849B2

(12) United States Patent
Huggins et al.

(10) Patent No.: US 11,306,849 B2
(45) Date of Patent: Apr. 19, 2022

(54) SEPARATION-RESISTANT PIPE JOINT WITH ENHANCED EASE OF ASSEMBLY

(71) Applicant: United States Pipe and Foundry Company, LLC, Birmingham, AL (US)

(72) Inventors: Russell J Huggins, Birmingham, AL (US); Jay Derek Caston, Birmingham, AL (US); William W Holmes, IV, Birmingham, AL (US)

(73) Assignee: UNITED STATES PIPE AND FOUNDRY COMPANY, LLC, Birmingham, AL (US)

( * ) Notice: Subject to any disclaimer, the term of this patent is extended or adjusted under 35 U.S.C. 154(b) by 519 days.

(21) Appl. No.: 16/310,363

(22) PCT Filed: Jun. 7, 2017

(86) PCT No.: PCT/US2017/036412
§ 371 (c)(1),
(2) Date: Dec. 14, 2018

(87) PCT Pub. No.: WO2017/218266
PCT Pub. Date: Dec. 21, 2017

(65) Prior Publication Data
US 2019/0309882 A1    Oct. 10, 2019

Related U.S. Application Data

(60) Provisional application No. 62/351,635, filed on Jun. 17, 2016.

(51) Int. Cl.
*F16L 21/03* (2006.01)
*F16L 21/08* (2006.01)
*F16L 23/028* (2006.01)

(52) U.S. Cl.
CPC ............. *F16L 21/03* (2013.01); *F16L 21/08* (2013.01); *F16L 23/0283* (2013.01)

(58) Field of Classification Search
CPC ........ F16L 21/03; F16L 21/08; F16L 23/0283
See application file for complete search history.

(56) References Cited

U.S. PATENT DOCUMENTS 3,684,320 A    8/1972   Platzer et al.
3,751,078 A    8/1973   O'Brian et al.
(Continued)

FOREIGN PATENT DOCUMENTS

DE    8311636    7/1983
FR    2352238    12/1977
(Continued)

OTHER PUBLICATIONS

Han, Inho "International Search Report and Written Opinion—International Application No. PCT/US2014/069810" Korean Intellectual Property Office; dated Apr. 24, 2015; pp. 1-29.
(Continued)

*Primary Examiner* — James M Hewitt, II
(74) *Attorney, Agent, or Firm* — Jake M. Gipson; Jake Neu; Bradley Arant Boult Cummings LLP

(57) ABSTRACT

A joint having a male joint member and female joint member with enhanced ease of assembly, in which a raised stop on the male joint member is limited to displacement between a constriction on the female joint member and a locking ring segment, in which the locking ring segment and constriction are separated by an unobstructed traverse region that allows the male joint member to slide axially when under stress without separation from the female joint member, and in which a compressible spacer is installed between the male joint member and female joint member to ensure that the raised stop is installed in an intermediate position between (Continued)

the constriction and the locking ring segment. The compressible spacer withstands forces associated with assembly but allows the joint to compress during extreme events to prevent failure of the joint during extreme events, such as earthquakes, floods, and landslides.

19 Claims, 23 Drawing Sheets

(56) References Cited

U.S. PATENT DOCUMENTS

| | | | |
|---|---|---|---|
| 4,097,074 A | | 6/1978 | Nagao et al. |
| 4,126,337 A | * | 11/1978 | Nagao ............... F16L 21/03 |
| | | | 285/231 |
| 4,183,561 A | * | 1/1980 | Miyamoto ........... F16L 17/10 |
| | | | 285/321 |
| 4,296,953 A | * | 10/1981 | Nagao ............... F16L 27/1275 |
| | | | 285/302 |
| 4,303,262 A | * | 12/1981 | Pierrel ............... F16L 21/08 |
| | | | 285/232 |
| 4,456,288 A | | 6/1984 | Conner |
| 4,540,204 A | | 9/1985 | Battle et al. |
| 4,606,559 A | | 8/1986 | Rammelsberg |
| 4,685,708 A | | 8/1987 | Conner et al. |
| 4,871,197 A | | 10/1989 | Codding, III et al. |
| 5,297,824 A | * | 3/1994 | Imhof ............... F16L 37/0925 |
| | | | 285/322 |
| 5,393,107 A | | 2/1995 | Vobeck |
| 5,476,290 A | | 12/1995 | Bergmann et al. |
| 5,607,190 A | | 3/1997 | Exandier et al. |
| 5,613,714 A | | 3/1997 | Toshima |
| 6,062,611 A | | 5/2000 | Percebois et al. |
| 6,502,867 B2 | | 1/2003 | Holmes, IV et al. |
| 7,137,653 B2 | | 11/2006 | Copeland |
| 7,806,445 B2 | | 10/2010 | Mutschlechner et al. |
| 8,573,654 B2 | | 11/2013 | Kishi et al. |
| 2006/0119100 A1 | | 6/2006 | Jones |
| 2009/0152866 A1 | | 6/2009 | Mutschlechner |
| 2010/0140922 A1 | | 6/2010 | Siemens |
| 2010/0230957 A1 | | 9/2010 | Tsuda et al. |
| 2011/0278835 A1 | | 11/2011 | Kishi et al. |
| 2015/0204469 A1 | | 7/2015 | Arnold |
| 2016/0298797 A1 | | 10/2016 | Caston et al. |

FOREIGN PATENT DOCUMENTS

| | | | | |
|---|---|---|---|---|
| FR | 2441122 A1 | * | 6/1980 | ............. F16L 21/08 |
| JP | 2002156079 | | 5/2002 | |
| JP | 2003-232467 | | 8/2003 | |
| JP | 2003232467 | | 8/2003 | |
| JP | 2005030469 | | 2/2005 | |
| JP | 2005344505 | | 12/2005 | |
| JP | 4542366 | | 9/2010 | |
| JP | 5197146 | | 5/2013 | |
| JP | 2014-142049 | | 8/2014 | |
| WO | 1996027752 | | 9/1996 | |
| WO | 14052521 | | 4/2014 | |
| WO | 2015089313 | | 6/2015 | |

OTHER PUBLICATIONS

Lee, Jong Kyung "International Search Report and Written Opinion—International Application No. PCT/US2017/036412" Korean Intellectual Property Office; dated Sep. 7, 2017; pp. 1-25.
International Organization for Standardization "International Standard Earthquake- and subsidence-resistant design of ductile iron pipelines" First edition Feb. 1, 2006; pp. 1-38.
U.S. Pipe "TR Flex and HP Lok Telescoping Sleeves BRO-053 for Industrial Applications, Water & Wastewater brochure" 2011 Edition; pp. 1-11.
U.S. Pipe "TR Flex Restrained Joint Ductile Iron Pipe and Fittings for Fire Protection, Water & Wastewater Bochure" 2012 Edition; pp. 1-47.
U.S. Pipe "TR Flex Restrained Joint Ductile Iron Pipe and Fittings for Fire Protection, Water & Wastewater brochure" 2013 Edition; pp. 1-45.
U.S. Pipe "TR Flex Restrained Joint Ductile Iron Pipe and Fittings for Fire Protection, Water & Wastewater" 2014 Edition; pp. 1-50.
Albaker, Fahad, M. "Examination Report—GCC application No. 2014-28523" dated May 31, 2018; pp. 1-6.
Eng. Ghassan F. Albuhairan "Examination Report—GC patent application No. 2017-33572" Patent Office of the Cooperation Council for the Arab States of the Gulf; dated Oct. 17, 2019; pp. 1-4.

* cited by examiner

SEPARATION-RESISTANT PIPE JOINT WITH ENHANCED EASE OF ASSEMBLY

CROSS-REFERENCE TO RELATED APPLICATIONS

This is a national stage of International Application No. PCT/US17/36412, filed 7 Jun. 2017 (pending), which is incorporated herein by reference in its entirety. International Application No. PCT/US17/36412 cites the benefit of the filing date of U.S. Pat. App. No. 62/351,635, filed 17 Jun. 2016.

BACKGROUND

Field of the Disclosure

The present disclosure relates generally to pipe fittings.

Background

Earth movement that occurs during floods, landslides, mudslides, seismic events, and other natural and man-made disasters applies forces to conduits that cause them to fail. Products may tolerate these forces via a number of methods, including inherent material flexibility or joint flexibility. When the conduit material is relatively inflexible, as is the case with iron or steel pipe, forces may be reduced to an acceptable level by adding joint deflection and/or displacement.

Several approaches have been taken to resist failure due to soil movement of pipes and other conduits. One approach has been to provide a restrained joint (as opposed to a flexible one), but such restrained joints cannot resist extremely high axial or radial forces, as they are designed to prevent axial displacement and deflection instead of allowing such movement without failure. One attempted solution was the placement of a crushable element between a fixed weld and a locking ring segment so that the crushable element could absorb excessive forces to prevent disengagement; however, when the crushable element fails under excessive forces, in some cases the remnants of the crushable element can damage components of the joint, such as gaskets. Other designs have involved locking rings placed around a pipe spigot internal to a pipe socket, which are complicated to install, and even more difficult to disassemble and service after installation.

Another approach has been to install the pipe in an intermediate position so that the pipe spigot, relative to the pipe socket, may travel in either axial direction when a compressive force or tension force is applied to the joint. These designs are difficult to install, however, because they require a degree of precision during assembly so that the pipe spigot is not inserted too far into the pipe socket. Because of the precision required, installers often cannot use heavy machinery like excavators or backhoes to assist in the assembly process; instead, they must use sophisticated or cumbersome joint assembly tools that make installation more burdensome and time consuming.

Consequently there is a long-felt need in the art for a pipe joint that resists separation under extreme stresses that can be easily installed and disassembled.

SUMMARY

A separation-resistant pipe joint with enhanced ease of assembly is provided. A general embodiment of the joint comprises: (a) a female joint member, said female joint member comprising: (1) an inner surface; (2) a first circumferential groove on the inner surface to accommodate a locking ring segment, said first circumferential groove having a shape consisting essentially of a frustum of an ellipsoid defined by two generally parallel planes each intersecting the ellipsoid; (3) a first constriction on the inner surface proximal to the first circumferential groove, the first constriction having a first constriction diameter; (4) an unobstructed traverse region between the first circumferential groove and the first constriction having a first regional diameter that is greater than the first constriction diameter; (5) an unobstructed reverse taper region proximal to the first constriction, having a second regional diameter that is greater than or equal to the first constriction diameter and which increases in the proximal direction; and (6) a second constriction on the inner surface proximal to the unobstructed reverse taper region, the second constriction having a second constriction diameter less than the first constriction diameter; (b) a male joint member inserted into the female joint member, the male joint member comprising an outer surface, a spigot mouth, and a raised stop on the outer surface positioned between the first circumferential groove and the first constriction, having a stop diameter greater than the first constriction diameter and less than the regional diameter; and (c) a compressible spacer selected from the group consisting of: (1) an intermediate compressible spacer located between the raised stop and the first constriction, the intermediate compressible spacer positioned to contact the raised stop when the joint is compressed, and (2) a terminal compressible spacer located between the spigot mouth and the second constriction, the terminal compressible spacer positioned to contact the spigot mouth when the joint is compressed; wherein the compressible spacer experiences strain of less than 0.25 under a compressive force of 33 Kip (147 kN). The shape of the circumferential groove allows deflection of the male joint member while permitting simple installation and servicing. The traverse region allows axial displacement of the joint members relative to one another, and the reverse taper region allows the male joint member to deflect while inserted into the female joint member without contacting the inner surface of the female joint member on the proximal end. Furthermore, the male and female joint members may be deflected without separation under stress, due to the shape of a circumferential groove that accommodates a locking ring segment and a reverse taper region toward the proximal portion of the female joint member. In addition, the compressible spacer resists compressive forces associated with machinery commonly used in the installation process, which allows assemblers to install easily the joint in an intermediate installation position that better resists extreme events.

Another general embodiment of the joint comprises (a) a female joint member comprising: (1) means to restrain a weld bead on a pipe spigot from removal due to excessive extension; (2) means to retain the restraining means and to permit said restraining means to deflect in any direction; (3) means to restrain the weld bead from excessive insertion; (4) an unobstructed traverse region between element (1) and element (3) having an axial length sufficient to allow at least 2" (5 cm) of axial displacement of the weld bead; and (5) an unobstructed reverse taper region proximal to element (3), having a second regional diameter greater than the diameter of the spigot that increases in the proximal direction; and (b) means to resist compressive forces associated with assembly such that the weld bead is located at an intermediate position after assembly, the intermediate position being a position between element (1) and element (3), said means to resist compressive forces experiencing a strain of less than 0.25 under a compressive force of 33 Kip (147 kN).

Methods of assembling a separation-resistant pipe joint are provided in which the pipe joint comprises the female pipe joint member, a male pipe joint member, a compressible spacer as provided above, and a locking ring segment having a shape complementary to the shape of the first circumferential groove. In one general embodiment of the method, the compressible spacer is the intermediate compressible spacer and the female pipe joint member comprises a notch that widens the socket mouth of the female joint member over an arc of less than 180°; the locking ring segment defining a circumferential arc that is smaller than the arc of the notch; and the method comprises: (a) placing the compressible spacer around the outer surface of the male joint member and between the raised stop and the spigot mouth; (b) inserting the male joint member and the compressible spacer into the female joint member until the compressible spacer contacts the first constriction of the female joint member and contacts the raised stop; (c) inserting the locking ring segment into the notch; and (d) sliding the locking ring segment into the first groove so that most of the locking ring segment is no longer in the notch. In another general embodiment of the method, the compressible spacer is the terminal compressible spacer and the female pipe joint member comprises a notch that widens the socket mouth of the female joint member over an arc of less than 180°; the locking ring segment defining a circumferential arc that is smaller than the arc of the notch; and the method comprises: (a) placing the compressible spacer inside of the female joint member and abutting the second constriction; (b) inserting the male joint member into the female joint member until the spigot mouth contacts the compressible spacer; (c) inserting a locking ring segment into the notch; and (d) sliding the locking ring segment into the first circumferential groove so that most of the locking ring segment is no longer in the notch.

A failure resistant system for delivering a fluid through a pipe is also provided. In a general embodiment the system comprises a plurality of the pipe joints provided above, in which the female joint member is a pipe bell, in which the pipe bell is joined to a second pipe.

The foregoing presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
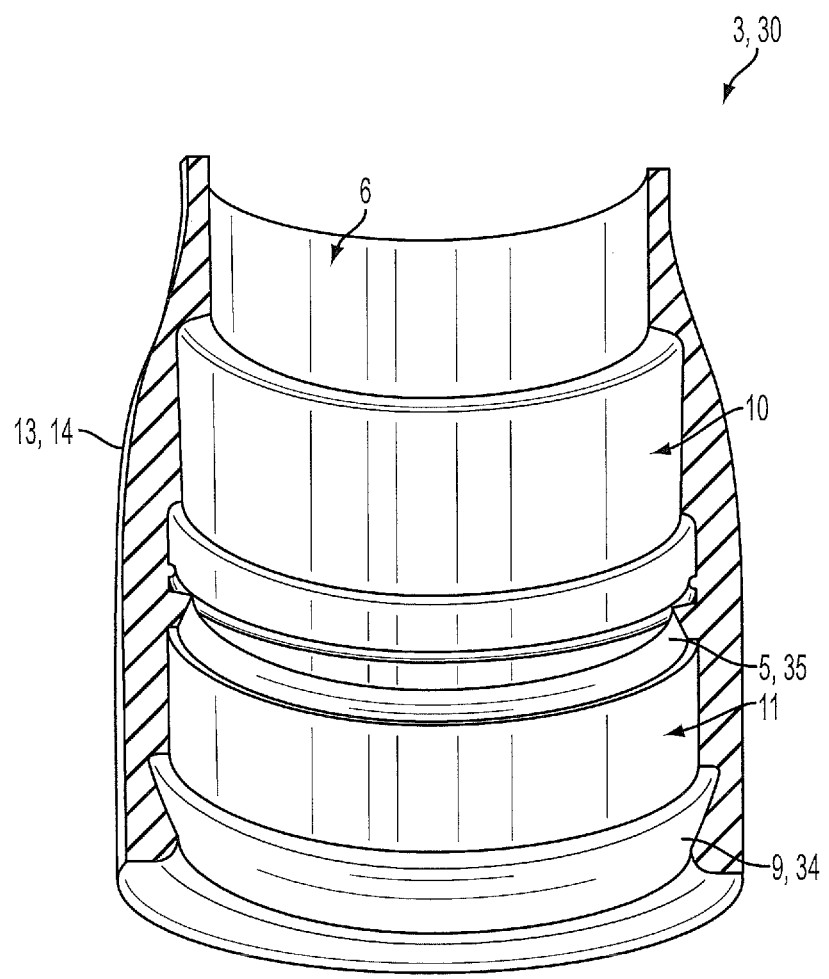
FIG. 1: A perspective view of an embodiment of the joint showing a cutaway of the female joint member.

With reference to the use of the word(s) "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

Unless stated otherwise, the term "consisting essentially of" means that, in addition to the recited elements, what is claimed may also contain other elements (steps, structures, ingredients, components, etc.) that do not adversely affect the operability of what is claimed for the intended purpose stated in this disclosure.

The terms "about" or "approximately" mean within a range of reasonable error around a central value. Such reasonable error may for example stem from the precision of an instrument or method used to measure the value. The error could also stem from the precision of a method of making a structure. For example, in some contexts these terms may mean+/−10%. In others these terms may mean±20%.

The terms "distal" and "proximal" mean directions on a structure that are toward the terminal end (distal) or away from the terminal end (proximal). In the context of this disclosure, "distal" will mean the axial direction toward the open end of the female joint member (i.e., the direction from the first constriction toward the first groove), and "proximal" will mean the axial direction away from the open end of the female joint member (i.e., the direction from the first groove toward the first constriction).

The term "axial" in this disclosure refers to the axis of flow in a pipe or similar structure.

The term "radial" in this disclosure refers to the direction perpendicular to the axis of flow toward the outside of a pipe.

The term "circumferential" in this disclosure refers to angular position, motion or direction around a centerline that is parallel to the axis of flow in a pipe or similar structure.

The term "deflection" means an angular deviation from a given axis. For example, deflection occurs between a male joint member 2 and a female joint member 3 when the axis of one is shifted so as to no longer be generally parallel to the other.

B. Pipe Joint

A separation-resistant pipe joint with enhanced ease of assembly 1 is provided. The joint 1 comprises a male joint member 2, a female joint member 3, and a compressible spacer 50, in which a raised stop 4 on the male joint member 2 has clearance to move between a first constriction 5 on the inner surface 6 of the female joint member 3 and a locking ring segment 8. Thus the male 2 and female 3 joint members may be axially displaced relative to one another without separation under stress (this property is referred to in some places as "axial flexibility"). Furthermore, the male 2 and female 3 joint members may be deflected without separation under stress, due to the shape of a first circumferential groove 9 that accommodates a locking ring segment 8 and a reverse taper region 10 toward the proximal portion of the female joint member 3. In addition, the compressible spacer 50 allows for enhanced ease of assembling the joint 1 in an intermediate position in which the raised stop 4 is not abutting the first constriction 5 or the locking ring segment 8. In this position, the male 2 and female 3 joint members may be axially displaced relative to each other in either direction when a compressive force or tension force is applied to the joint 1.

A general embodiment of the joint 1 comprises: (a) a female joint member 3, said female joint member 3 comprising: (1) an inner surface 6; (2) a first circumferential groove 9 on the inner surface 6 to accommodate a locking ring segment 8, said first circumferential groove 9 having a shape consisting essentially of a frustum of an ellipsoid defined by two generally parallel planes each intersecting the ellipsoid; (3) a first constriction 5 on the inner surface 6 proximal to the first circumferential groove 9, the first constriction 5 having a first constriction diameter; (4) an unobstructed traverse region 11 between the first circumferential groove 9 and the first constriction 5 having a first regional diameter that is greater than the first constriction diameter; (5) an unobstructed reverse taper region 10 proximal to the first constriction 5, having a second regional diameter that is greater than or equal to the first constriction diameter and which increases in the proximal direction; and (6) a second constriction 60 on the inner surface 6 proximal to the unobstructed reverse taper region 10, the second constriction 60 having a second constriction diameter less than the first constriction diameter; (b) a male joint member 2 inserted into the female joint member 3, the male joint member 2 comprising an outer surface 12, a spigot mouth 61, and a raised stop 4 on the outer surface 12 positioned between the first circumferential groove 9 and the first constriction 5, having a stop diameter greater than the first constriction diameter and less than the regional diameter; and (c) a compressible spacer 50 selected from the group consisting of: (1) an intermediate compressible spacer 51 located between the raised stop 4 and the first constriction 5, the intermediate compressible spacer 51 positioned to contact the raised stop 4 when the joint 1 is compressed, and (2) a terminal compressible spacer 52 located between the spigot mouth 61 and the second constriction 60, the terminal compressible spacer 52 positioned to contact the spigot mouth 61 when the joint 1 is compressed; wherein the compressible spacer 50 experiences strain of less than 0.25 under a compressive force of 33 Kip (147 kN).

Another general embodiment of the joint 1 comprises: (a) a female joint member 3 comprising: (1) means to restrain a weld bead 33 on a pipe spigot 29 from removal due to excessive extension; (2) means to retain the restraining means 34 and to permit said restraining means to deflect in any direction; (3) means to restrain the weld bead from excessive insertion 35; (4) an unobstructed traverse region 11 between element (1) and element (3) having an axial length sufficient to allow at least 2" (5 cm) of axial displacement of the weld bead 27; and (5) an unobstructed reverse taper region 10 proximal to element (3), having a second regional diameter greater than that of the spigot 29 that increases in the proximal direction; and (b) means to resist compressive forces associated with assembly 53 such that the weld bead is located at an intermediate position after assembly, the intermediate position being a position between element (1) and element (3), said means to resist compressive forces experiencing a strain of less than 0.25 under a compressive force of 33 Kip (147 kN). The means to restrain the weld bead 33 from removal may be any known in the art, or it may be any of the locking ring segments 8 disclosed herein. The means to retain the restraining means 34 may be any known in the art, or it may be any of the circumferential grooves 9 disclosed herein. The means to restrain the weld bead from excessive insertion 35 may be any known in the art, or it may be any of the constrictions disclosed herein. The means to resist compressive forces associated with assembly 53 may be any known in the art, or it may be any of the compressible spacers 50 disclosed herein.

Such embodiments of the joint 1 are illustrated in FIGS. 2, and 11 through 14.

Figure 2A:
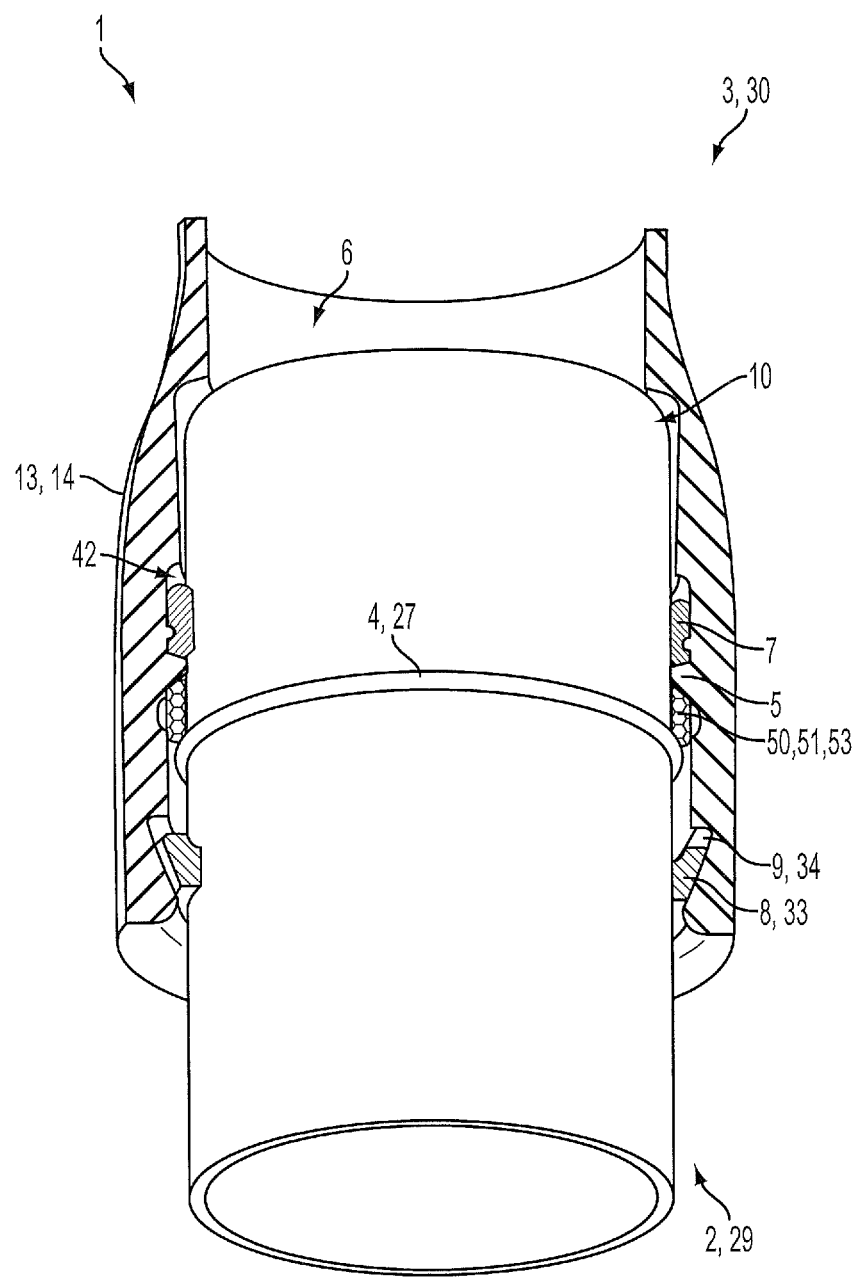
FIGS. 2A AND 2B: Perspective views showing a cutaway of the female joint member of the embodiment shown in FIG. 1, in which the male joint member is axially positioned so that the raised stop is between the locking ring segment and the first constriction.
Figure 2B:
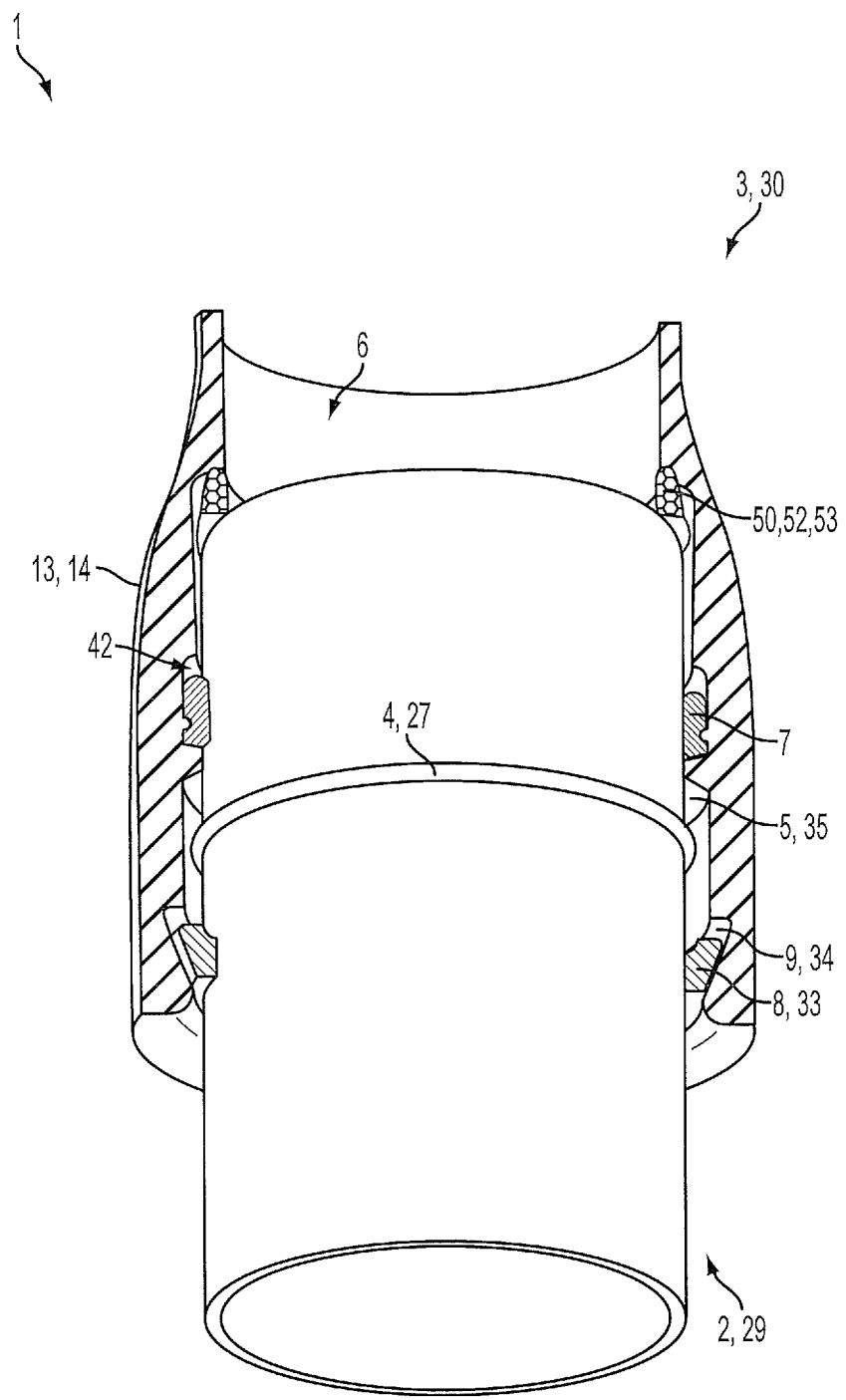
Figure 6:
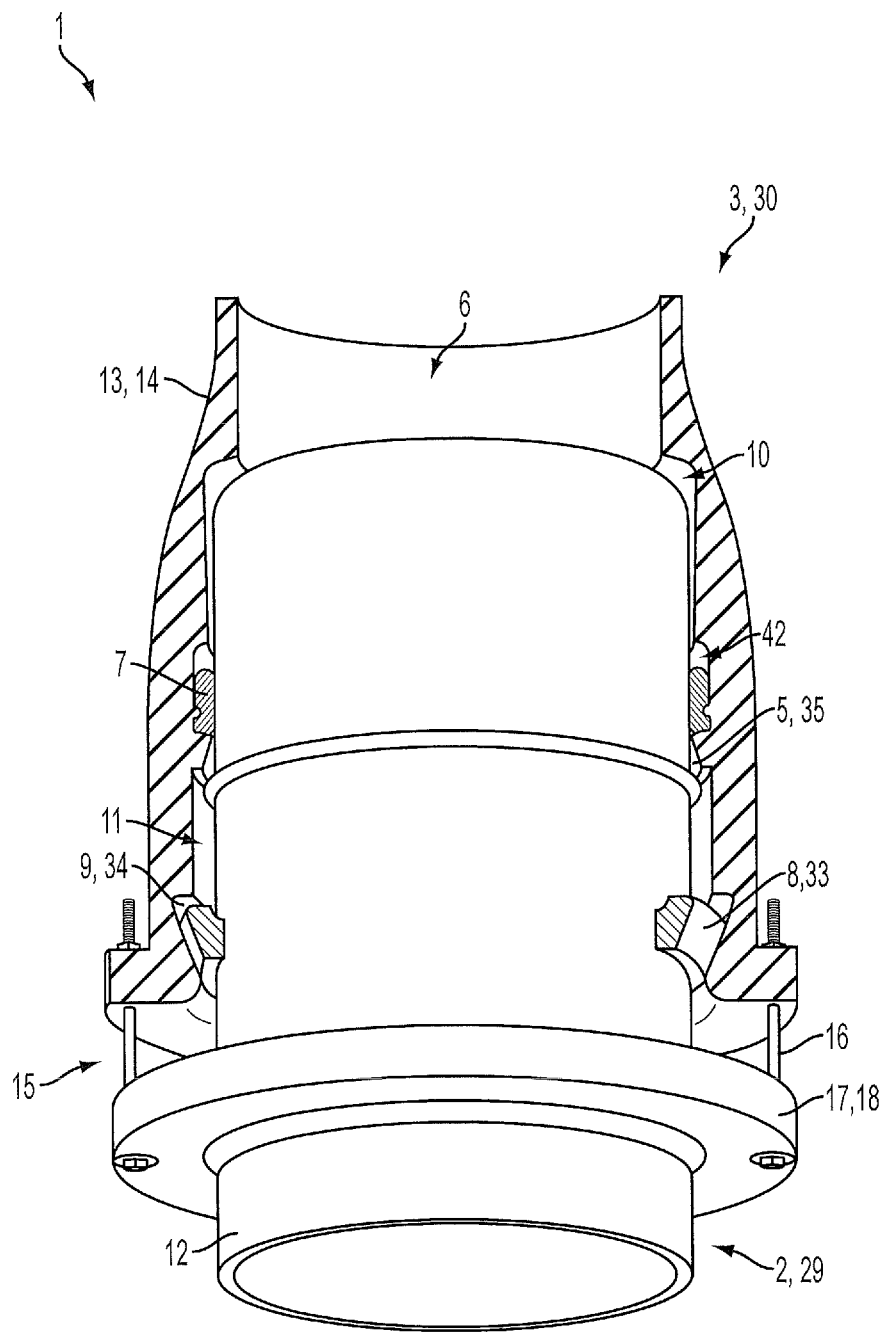
FIG. 6: An embodiment of the joint comprising a restraint fastened to the female joint member and the male joint member.

In an embodiment of the assembled joint 1, the joint 1 comprises a locking ring segment 8 in the first circumferential groove 9, the locking ring segment 8 having a shape complementary to the shape of the first groove 9; and a male joint member 2 inserted into the female joint member 3, the male joint member 2 comprising an outer surface 12 and a raised stop 4 on the outer surface 12 positioned between the locking ring segment 8 and the first constriction 5, having a stop diameter greater than the first constriction diameter and less than the regional diameter. Exemplary embodiments of the assembled joint 1 are shown in FIGS. 2 and 6.

The male joint member 2 is configured to be inserted into the female joint member 3. As such it may generally be considered a "spigot," 29 although other types of male joint members 2 are possible. In addition to the outer surface 12, the male joint member 3 will in many embodiments comprise an inner conduit to carry fluid, including an inner surface. The fluid may be, for example, a liquid, a typical example of which would be water (including freshwater and wastewater). In some embodiments of the joint 1 the male joint member 2 is a pipe spigot 29 comprising a circumferential weld bead 27.

The male 2 and female 3 joint members may be constructed from any suitable material, including polymers such as polyvinyl chloride, ceramic, wood, stone, concrete, and metal. Some embodiments of the joint members are constructed from copper, aluminum, iron, steel, or an alloy of any of the foregoing. In a specific embodiment the joint member is constructed from ductile iron. The members may also be coated, for example with a galvanizing layer, such as zinc.

The outer surface 12 of the male joint member 2 may take many forms, so long as it fits into the female joint member 3. In some embodiments the outer surface 12 of the male joint member 2 forms a cylinder.

The raised stop 4 on the outer surface 12 of the male joint member 2 is a region of increased outer diameter ("stop diameter") connected to or constructed on the outer surface 12 in such a way that the male joint member 2 does not move relative to the stop 4. Thus, if the stop 4 encounters an obstruction it can arrest movement of the male joint member 2. Some embodiments of the raised stop 4 may be part of the cast shape of the male joint member 2. Other embodiments are separate structures that are attached to the male joint member 2. In a specific embodiment the stop 4 is a weld bead 27 going around the circumference of the outer surface 12. The weld bead 27 has the advantage of being easily installed on the male joint member 2 either during manufacture or on site, and can be used to retrofit a previously existing spigot 29. The raised stop 4 may be continuous or interrupted, so long as it will contact the first constriction 5 and the locking ring segment 8 in a manner to arrest axial displacement.

The locking ring segment 8 is a structure that is placed within the first groove 9.

The female joint member 3 is configured to allow insertion of the male joint member 2. As such it may generally be considered a "bell" or "socket," although other types of female joint members 3 are possible. The inner surface 6 defines a fluid conduit. The fluid may be, for example, a liquid, a typical example of which would be water (including freshwater and wastewater). The fluid could also be a gas, such as fuel gas. In addition to the inner surface 6, the female joint member 3 comprises an outer surface 13.

The first circumferential groove 9 is a region on the inner surface 6 of the female joint member 3 with a greater diameter than the surrounding regions. The female joint member 3 may be fabricated with the first groove 9 as an integral part, the first groove 9 may be made in the inner surface 6 of the female joint member 3 after fabrication, or the first groove 9 may be formed by one or more separate structures that are fastened to the inner surface 6 of the female joint member 3. It accommodates the locking ring segment 8 in such a way as to limit the axial movement of the locking ring segment 8. The limitation on the axial movement of the locking ring segment 8 may be relatively absolute, in which case the locking ring segment 8 is not free to move any significant distance in an axial direction. In other cases the limitation on the axial movement may be less absolute, such that the locking ring segment 8 may move a small distance in an axial direction.

The first constriction 5 on the inner surface 6 is a region having a smaller diameter than the adjacent regions ("constriction diameter"). When the joint 1 is assembled, the first constriction 5 is on the opposite side of the raised stop 4 as the locking ring segment 8. The first constriction 5 diameter is less than the diameter of the raised stop 4; thus the raised stop 4 cannot pass the first constriction 5, and this limits the relative axial movement of the male 2 and female 3 joint members. In many embodiments the first constriction 5 is cast as part of the integral shape of the female joint member 3. In some embodiments the first constriction 5 may be machined into the inner surface 6 of the female joint member 2 after fabrication. In other embodiments the first constriction 5 is formed by one or more separate structures that are fastened to the inner surface 6 of the female joint member 3. The first constriction 5 may be continuous or interrupted, so long as the interruptions allow it to function to prevent the raised stop 4 from passing.

Between the first circumferential groove 9 and the first constriction 5 is the unobstructed traverse region 11 of the female joint member 3. The traverse region 3 has a regional diameter that is greater than the stop diameter, allowing the stop 4 to move axially in the traverse region 11. The regional diameter that is greater than the stop diameter may be a property of the entire traverse region 11, or there may be sub-regions with the greater diameter. For example, a possible embodiment comprises one or more grooves in the traverse region 11 that allow one or more raised stops 4 to move axially. The length of the traverse region 11 will vary depending on the size of the joint 1. The traverse region 11 is sufficiently long to allow a significant amount of axial flexibility in the joint 1. In some embodiments of the joint 1, the axial length of the traverse region 11 is about 30-45% of the inner diameter of the female joint member 3 at its narrowest point. In a specific embodiment of the joint 1, the axial length of the traverse region 11 is about 37.5% of the inner diameter of the female joint member 3 at its narrowest point. In embodiments of the joint 1 in which the female joint member 3 is a pipe bell 30, and in which the pipe bell 30 is joined to a second pipe 31 having a second pipe axial length, the axial length of the traverse region 11 may be defined by the axial length of the second pipe 31. For example, in some embodiments of the joint 1, the axial length of the traverse region 11 is at least about 0.2%, at least about 0.5%, about 0.2-1.0%, or about 0.5-1.0% of the second pipe axial length. In a particular example, the interior diameter of the female joint member 3 is 6" (15 cm), the distance from the raised stop 4 to the distal end of the male joint member 2 is 5.75" (14.6 cm), and the length of the traverse region 11 is 2.25" (5.7 cm).

Some embodiments of the female joint member 3 have an outer surface 13 with a streamlined shape. The streamlined shape has the advantage of posing less resistance to a shifting matrix, for example during a geologic or seismic event when the joint 1 may be moving relative to the soil. In such embodiments the female joint member 3 comprises a streamlined outer surface 14 that increases in diameter in the distal direction. The degree of increase in the distal direction may be defined according to the angle of increase. In some versions of the streamlined 14 female joint member 3, the increase in diameter does not exceed about 10° at any point. In further embodiments, the increase in diameter is no more than about 6° at any point. In further embodiments, the increase in diameter is no more than about 3-10° at any point. In embodiments of the female joint member 3 in which the female joint member 3 is a pipe bell 30 joined to a second pipe 31 at its proximal end, the degree of increase in the distal direction may be defined according to the angle of increase between the first groove 9 and the point at which the bell 30 is joined to the second pipe 31. In such embodiments, the angle of increase in diameter between the first groove 9 and the point at which the bell 30 is joined to the second pipe 31 does not exceed a value selected from the group consisting of: 3, 6, and 10°. In a further such embodiment the angle of increase in diameter between the first groove 9 and the point at which the bell 30 is joined to the second pipe 31 is about 3-10°.

In some embodiments of the joint 1, a restraint 15 maintains the relative axial positions of the male 2 and female 3 members. This has the advantage of preventing the male joint member 2 from slowly extending from the female joint member 3 due to the internal fluid pressure near places where the direction of the flow or diameter of the conduit changes, which will naturally tend to cause such extension over time. The restraint 15 is an external structure fastened to both joint members. The restraint 15 is positioned to maintain the relative positions of the male 2 and female 3 joint members such that the raised stop 4 remains positioned between the locking ring segment 8 and the first constriction 5, and the restraint 15 is designed to fail when exposed to stress exceeding an axial stress threshold. The axial stress threshold will be greater than the stress the pipe is designed to handle under normal conditions. In many situations this can be calculated by multiplying the internal fluid pressure the pipe is designed to carry times the cross-sectional area of the pipe (outer radius squared times pi). The stress threshold will in many cases include a margin of safety to prevent the restraint 15 from failing due to transient spikes in fluid pressure. For example, the stress threshold may be greater than twice the internal fluid pressure the pipe is designed to carry times the cross-sectional area of the pipe. For example, in a municipal water system with internal pressures typically in the range of 80-120 psi (516-827 kPa), a restraint could be used that fails at stresses above those that would be caused by an internal pressure of 240 psi (1655 kPa); this would be a force that is the product of 240 psi (1655 kPa) multiplied by the cross-sectional area of the pipe. So, for a 6" (15 cm) pipe, in this example the stress threshold would be above 6794.4 lb (30.223 kN). One of ordinary skill in the art could calculate the necessary stress threshold based on the intended internal pressure of the pipe for a variety of situations.

Ideally the stress threshold will be below the expected stress from a disaster event. The failure of the restraint 15 will allow relative displacement of the male 2 and female 3 members, potentially saving the joint 1 from separation. The maximum value of the stress threshold will depend on the nature of the anticipated disaster. Some embodiments of the restraint 15 will have a stress threshold that is below the generally accepted stresses an earthquake resistant pipe must endure. One of ordinary skill in the art can refer to industry standards for earthquake resistant pipe. For example, ISO 16135 "Earthquake- and subsidence-resistant design of ductile iron pipelines" (2006) provides standards for four classes of earthquake resistant pipe based on slip-out resistance in Table 2. The lowest class of earthquake resistance, Class D, will resist slip-out to a level of less than 0.75 kN/mm times the diameter of the pipe in mm. In one embodiment of the restraint, the stress threshold is below 0.75 kN/mm times the diameter of the pipe. In the case of a 6" (15 cm) pipe in such an embodiment, the stress threshold would be below about 112.5 kN (25291 lb). In a specific embodiment of the restraint, the stress threshold is from about 1655 kPa times the cross-sectional area of the pipe to above 0.75 kN times the diameter of the pipe.

One embodiment of the restraint 15 comprises a restraining ring 17 fastened to the male joint member 2 and connected to the female joint member 3 by one or more bolts 16. Some portion of the restraint 15 is designed to fail above the threshold stress. This may be, for example, the bolt 16. The restraining ring 17 may be fastened to the male joint member 2 in a variety of ways. For example, it may be welded to the male joint member 2, as shown in FIG. 6. In other embodiments the restraining ring 17 may be a clamp ring 18, in which case it may be clamped on the male joint member 2. It is further contemplated that the restraining ring 17 may be bolted or glued to the male joint member. In a specific embodiment the restraining ring 17 is an integrally cast part of the male joint member 2. Such an integrally cast restraining ring 17 has the advantage of great structural strength. Retaining rings 17 that are fastened to the male joint member 2 after casting have the advantage of ease of installation in the field, and can be installed on a pipe spigot 29 that has not been specially fabricated.

It is contemplated that upon assembly the male 2 and female 3 joint members will be positioned such that the raised stop 4 will be located at some point in the traverse region 11. In embodiments of the joint 1 comprising the restraint 15, the restraint 15 will serve to maintain such a position during normal operation. Some embodiments of the joint 1 are assembled with the raised stop 4 closer to the first constriction 5 than to the first groove 9 (see for example FIGS. 2 and 6). In further embodiments, the ratio of the value of the distance from the first groove 9 to the raised stop 4 and the value of the distance from the first groove 9 to the first constriction 5 is selected from: 50%, 60%, 70%, 75%, 80%, 85%, 90%, 95%, 99%, 100%, a range between any two of the foregoing values, or at least any of the foregoing values. In a specific embodiment the joint 1 is assembled with a ratio of the value of the distance from the first groove 9 to the raised stop 4 and the value of the distance from the first groove 9 to the first constriction 5 of about 82%; an example of such an embodiment is a 6" pipe socket with a distance from the first groove 9 to the first constriction 5 of 2.84" in which the joint 1 is assembled with the raised stop 4 0.5" from the first constriction 5 and 2.34" from the first groove 9. Assembling the joint 1 with the raised stop 4 closer to the first constriction 5 than to the locking ring segment 8 has the advantage of allowing a large degree of displacement by extending the total length of the joint 1; this is particularly advantageous because joint failure is more likely to occur when an extending force is applied than when compressing force is applied during seismic events.

Figure 8A:
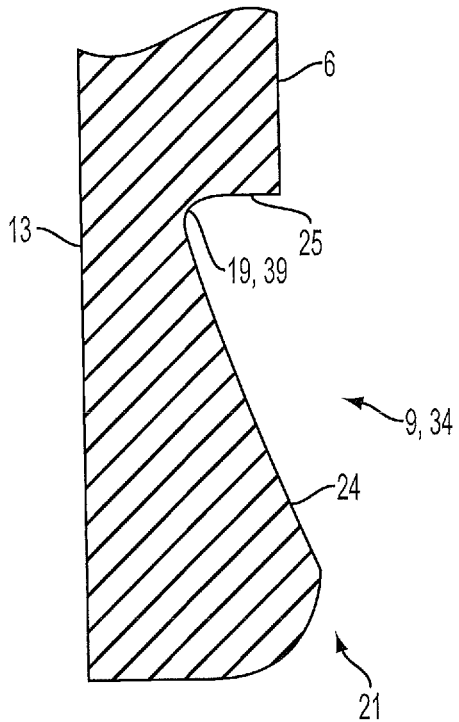
FIG. 8: Cross-sectional detail of three embodiments of the circumferential groove. 8A shows an embodiment of the first groove in which the corner between the distal surface and the proximal surface is a rounded corner. 8B shows an embodiment of the first groove in which the corner between the distal surface and the proximal surface is a sharp corner. 8C shows an embodiment of the first groove in which the corner between the distal surface and the proximal surface is a beveled corner.
Figure 8B:
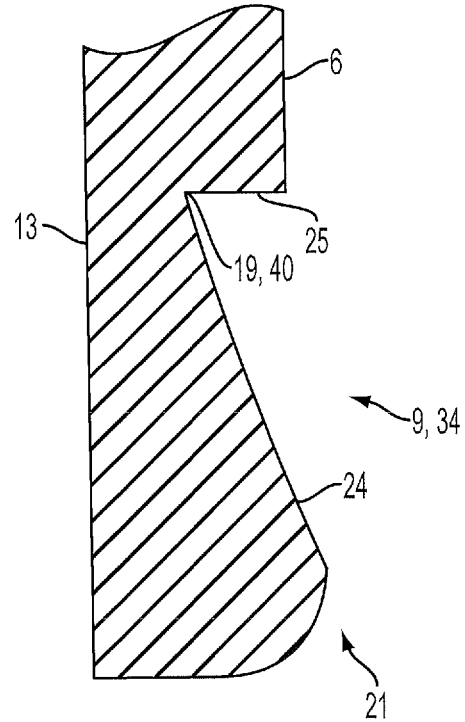
Figure 8C:
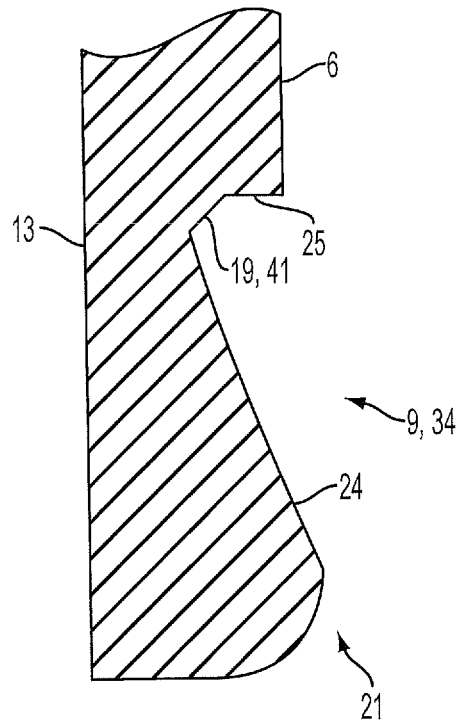

The first groove 9 has a shape consisting essentially of a frustum of an ellipsoid defined by two generally parallel planes each intersecting the ellipsoid. In some embodiments, the generally parallel planes intersect the ellipsoid such that the center of the ellipsoid is not between the two generally parallel planes. The term "ellipsoid" includes a sphere, and in a specific embodiment the ellipsoid is a sphere. The frustum is thus defined by the two parallel planes and by the curved surface of the ellipsoid between the two planes. In some embodiments of the first groove 9, such as the ones illustrated in FIG. 8, the plane on the distal side will not actually be manifested as a surface forming the first groove 9. In such embodiments the first groove 9 comprises a distal surface 24 defined by the curved surface of the ellipsoid and a proximal surface 25 defined by the proximal plane, and in which the distal surface 24 and the proximal surface 25 meet at a corner 19. In this specific context, the term "consisting essentially" means that the distal surface 24 will not significantly deviate from the shape of the curved surface of the ellipsoid, and will meet the proximal surface 25 at a corner 19; however the less critical proximal surface 25 may contain minor deviations, such as a depression 26 in the proximal plane at an edge of the first groove 9 allowing the insertion of a locking ring segment 8 having an arcuate length greater than the arcuate length of the notch 20. Absent such a depression 26 it would not be possible to insert a locking ring segment 8 into the first groove 9 with an arcuate length exceeding that of the notch 20.

Some embodiments of the first groove 9 consist of the distal surface 24 defined by the surface of the ellipsoid and the proximal surface 25 defined by the proximal plane (i.e., there is no significant deviation from either of these shapes).

The distal surface 24 and proximal surface 25 may meet at various types of corners 19. Examples include a rounded corner 39, a sharp corner 40, and a beveled corner 41. In this context the term "corner" 19 cannot be interpreted to mean any shape that would radially widen the first groove 9 beyond what is defined by the frustum.

The joint 1 may contain a gasket 7 between the first constriction 5 and the reverse taper region 11. The gasket 7 functions to provide a fluid-tight seal between the male 2 and female 3 joint members. The gasket 7 may be made of any suitable material known in the art, such as polymer rubber or silicone. There may be a gasket groove 42 between the first constriction 5 and the reverse taper region 11 to accommodate the gasket 7. Generally the gasket 7 will be positioned so that the seal will be maintained even when the male joint member 2 is fully extended (i.e., the raised stop 4 is in contact with the locking ring segment 8).

Some embodiments of the joint 1 comprise a notch 20 that widens the socket mouth 21 of the female joint member 3 over an arc that is less than 180°. The notch 20 allows the insertion and removal of a locking ring segment 8 without disassembly of the joint 1. Accordingly, in some embodiments, the notch 20 widens the socket mouth 21 of the female joint member 3 over an arc that is at least as large as the arc of the locking ring segment 8. Some embodiments of the notch 20 widen the socket mouth 21 of the female joint member 3 over an arc of about 90°. A notch 20 of greater arcuate length has the advantage of allowing the insertion of a locking ring segment 8 of greater arcuate length; whereas a notch 20 of lesser arcuate length has the advantage of providing greater strength to the female joint member 3.

The female joint member 3 may comprise more than one notch 20 that widens the socket mouth 21 of the female joint member 3 (although in some embodiments there will be only one notch 20). Some embodiments of the female joint member 3 comprise two notches (a first notch 20 and a second notch 43). In further such embodiments the first 20 and second 43 notches each widens the socket mouth 21 of the female joint member 3 over an arc of about 90°. In a specific embodiment the two notches 20 and 43 are positioned 180° from one another. Such positioning of the notches 20 and 43 has the advantage that the joint 1 may be installed at any rotational orientation while always providing a notch 20 that is at least partially in the top half of the socket mouth 21 of the female joint member 3, which causes the locking ring segments 8 to be maintained in place by force of gravity.

The locking ring segment 8 is a ring or an arc of a ring, shaped to fit within the first circumferential groove 9. Thus the shape of the locking ring segment 8 and the shape of the first groove 9 depend on one another. When within the first circumferential groove 9, the radial distance from the centerline of the female joint member 3 to the inner surface of the locking ring segment 8 will be smaller than the radial distance from the centerline to the outer surface of the raised stop 4 when the male joint member 2 is inserted into the female joint member 3. Thus the stop 4 cannot pass the locking ring segment 8. Some embodiments of the locking ring segment 8 and first circumferential groove 9 are configured to provide additional flexibility to the joint 1 by permitting deflection between the male 2 and female 3 joint members without separation. For example, the locking ring segment 8 may have a distal surface that is the shape of a frustum of the ellipsoid that defines the shape of the first groove 9. Embodiments of the joint 1 comprising a first circumferential groove 9 that is frusto-ellipsoidal and a locking ring segment 8 of complimentary shape and dimensions have the advantage that the ring 8 and first groove 9 will behave like a universal joint. The locking ring segment 8 may deflect in any direction relative to the first groove 9. The total degree of deflection will be limited by the amount of overlap between the male 2 and female 3 joint members. This imparts increased flexibility to the joint 1, allowing it to resist separation when under shear.

When the locking ring segment 8 has a shape that tapers in the proximal direction, an extending force will cause the raised stop 4 to push against the locking ring segment 8, which will in turn cause the tapered surface to push against the first groove 9, which will then impart a force vector that will press the locking ring segment 8 against the outer surface 12 of the male joint member 2. When the locking ring segment 8 is pressed against the outer surface 12 of the male joint member 2 it will not permit the raised stop 4 to pass, preventing separation.

The locking ring segment 8 comprises a circumferential arc 28. One example comprises two nearly semicircular ring segments 8, or a split ring. Another such example comprises one or more ring segments 8 each defining a circumferential arc 28 of less than about 180°. A more specific example comprises two ring segments 8 and 36 each defining a circumferential arc of less than about 180°. Further examples comprise one or more ring segments 8 each defining a circumferential arc 28 of less than about 90°. Still further examples comprise one or more ring segments 8 each defining a circumferential arc 28 of less than about 45°. It will of course be understood that any number of ring segments 8 may be used, so long as the sum of the circumferential arcs 28 of the ring segments do not exceed 360°. The sum of the arcs 28 of the ring segments 8 may be less than 360°. Embodiments of the joint 1 in which the sum of the arcs 28 of the ring segments 8 is smaller have the advantage of lower weight (and potentially easier installation). Embodiments of the joint 1 in which the sum of the arcs 28 of the ring segments 8 is larger have the advantage of increased contact area between the ring segments 8 and the first circumferential groove 9, which increases the separation resistance of the joint 1.

If the female joint member 3 comprises a notch 20 that widens the socket mouth 21 of the female joint member 3 over an arc that is at least as large as the arc 28 of the locking ring segment 8 (as shown in FIGS. 3, 4, 7, and 10), the locking ring segment 8 may be installed after the male joint member 2 has been placed inside the female joint member 3. In such embodiments, the locking ring segment 8 can be inserted into the first circumferential groove 9 through the notch 20, and then slid into another section of the first circumferential groove 9 such that the ring segment 8 will abut the proximal wall of the first groove 9. A female joint member 3 with fewer notches 20 or smaller notches 20 has the advantage of greater structural strength.

Figure 3:
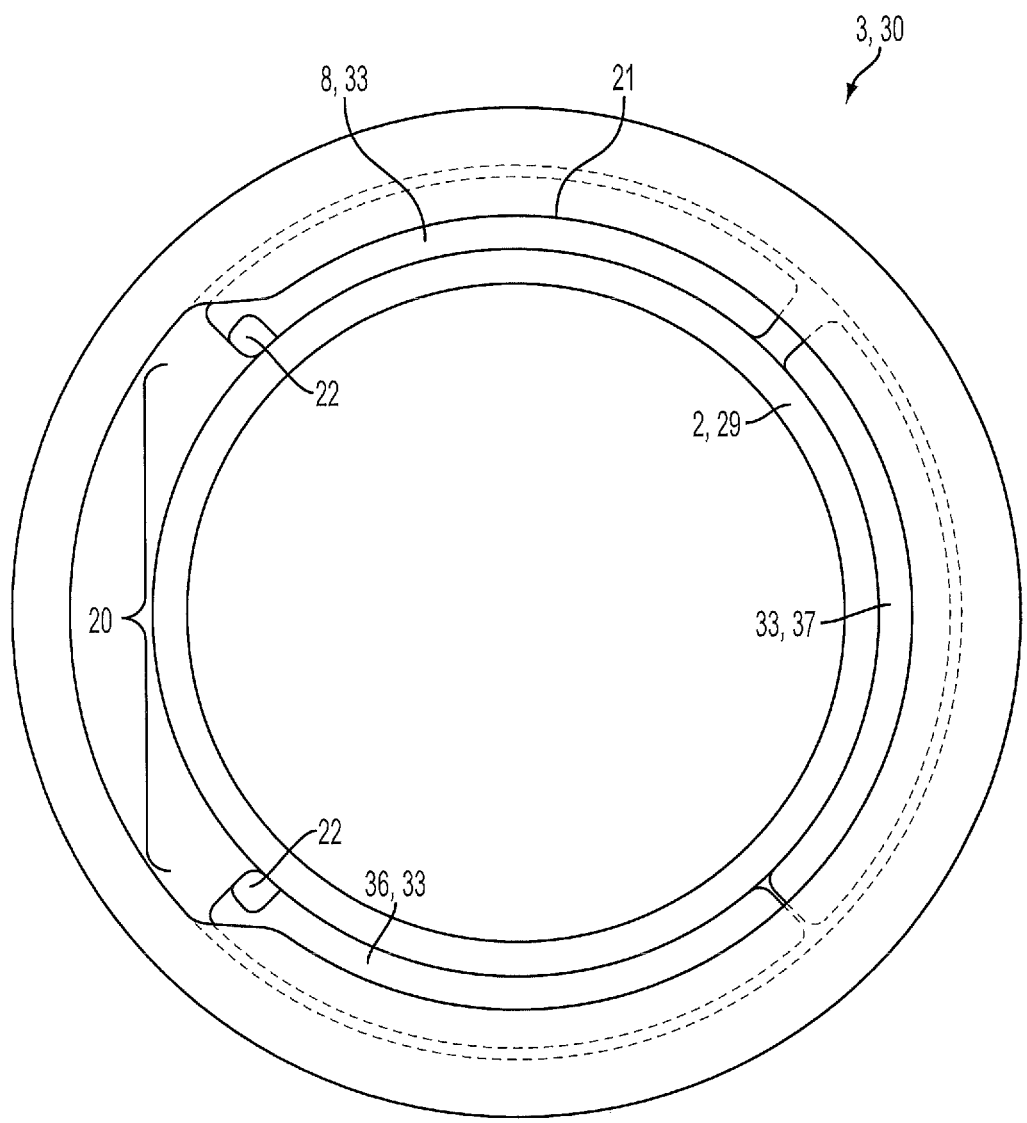
FIG. 3: A front view of an embodiment of the female joint member, comprising a notch, and showing locking ring segments inserted (dashed lines showing the positioning of three locking ring segments inserted into the first groove).
Figure 4:
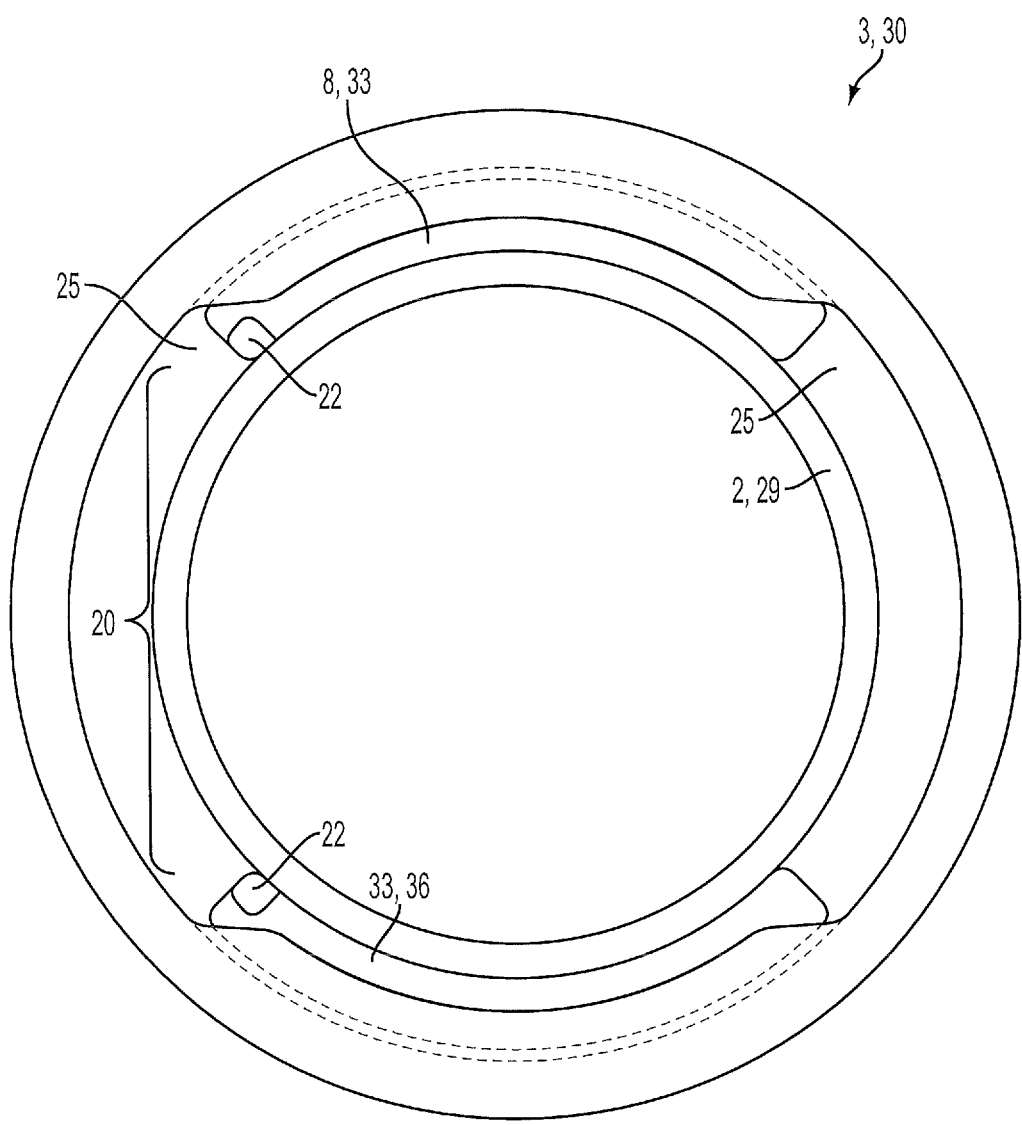
FIG. 4: A front view of an embodiment of the female joint member, comprising two notches, and showing locking ring segments comprising tabs inserted (dashed lines showing the positioning of two locking ring segments inserted into the first groove).

Various configurations of the locking ring segments 8 can be used to confer corresponding advantages. One embodiment of the joint 1 comprises two locking ring segments 8 and 36 each defining a circumferential arc 28 of about 90°. A more specific embodiment of the joint comprises two locking ring segments 8 and 36 each defining a circumferential arc 28 of about 90°, and each comprising a tab 22 (as shown in FIG. 4). In this embodiment the joint 1 comprises one or two notches 20 that widen the socket mouth 21 of the female joint member 3 over an arc of about 90°. Another embodiment of the joint 1 comprises one notch 20 that widens the socket mouth 21 of the female joint member 3 over an arc of about 90° and three locking ring segments 8, 36 and 37, two of which each comprise a tab 22 (as shown in FIG. 3).

Figure 5A:
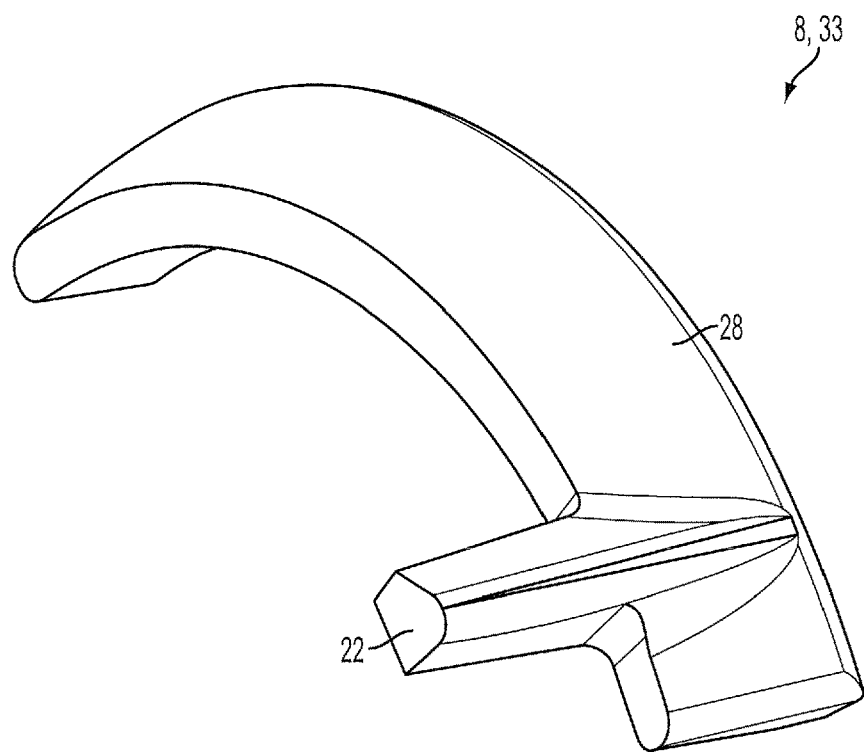
FIG. 5A: An embodiment of the locking ring segment comprising a tab in which the arc of the locking ring segment extends beyond the point where the tab meets the arc.
Figure 5B:
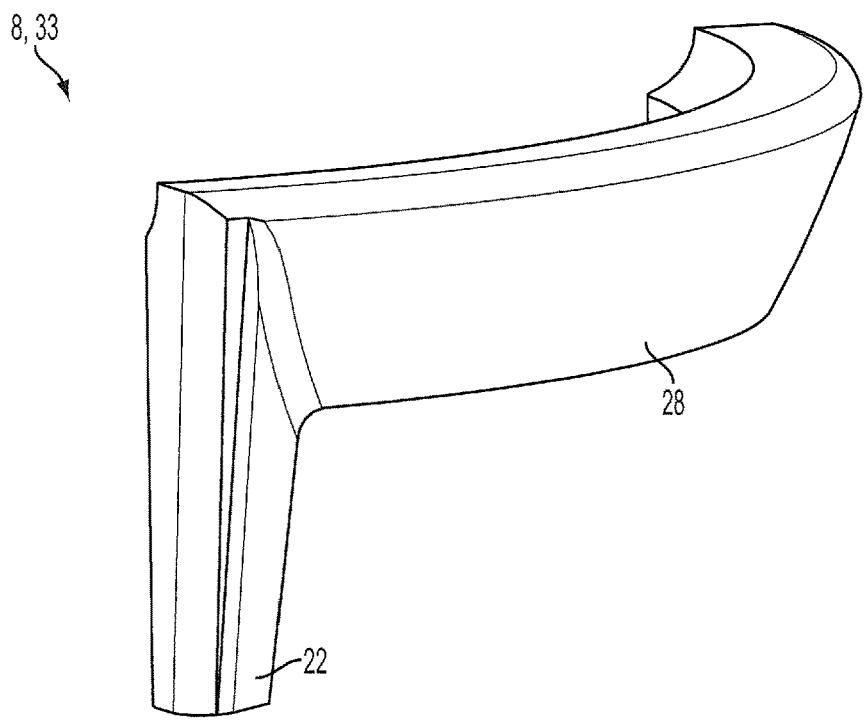
FIG. 5B: An embodiment of the locking ring segment comprising a tab in which the arc of the locking ring segment terminates at the point where the tab meets the arc.

As indicated above, the locking ring segment 8 may comprise a tab 22 (as shown in FIGS. 5A and 5B). The tab 22 is a protrusion from the arc 28 of the locking ring segment 8 that allows the locking ring segment 8 to be easily removed from the first groove 9 through the notch 20. Some embodiments of the tab 22 extend axially distally; in such embodiments the tabs 22 prevent the locking ring segments 8 from sliding into the first groove 9 away from the notch 20. Such embodiments have the advantages of keeping the locking ring segments 8 in place relative to the notch 20 and allowing the locking ring segment 8 to be removed by grasping the tab 22 and sliding the locking ring segment 8 into the notch 20.

In a specific embodiment the locking ring segment 8 comprises a tab 22 extending axially distally in regard to the female joint member 3, in which the arc 28 of the locking ring segment 8 extends beyond the point where the tab 22 meets the arc 28 (as shown in FIG. 5A). When inserted into the first groove 9 through the notch 20, the portion of the arc 28 of the locking ring segment 8 that extends beyond the point where the tab 22 meets the arc 28 will remain in the notch 20. It has been found that during seismic events, pipe spigots 29 will distend or "ovalize" if the spigot 29 deflects too far, and that the presence of a notch 20 in the bell makes the spigot 29 particularly vulnerable to ovalization and failure. Deflection of the spigot 29 into contact with the socket mouth of the bell 30 at the location of a notch 20 under extreme stresses has been discovered to result in deformation of the spigot 29 that causes the raised stop to disengage from the locking ring segment 8, and ultimately separation of the joint. The same type of ovalization has been observed in joints subjected to extreme axial extension stresses. The placement of a locking ring segment 8 that extends into the notch will serve to discourage ovalization of the spigot 29 by reducing the required circumferential size of the notch 20 and by providing additional resistance to radial movement of the male pipe joint member 2. The use of a locking ring segment 8 comprising a portion of its arc 28 that extends beyond the point where the tab 22 meets the arc 28 will partially occupy the gap formed by the notch 20, and aid in resisting such ovalization of the spigot 29 during extreme stress events.

Figure 7:
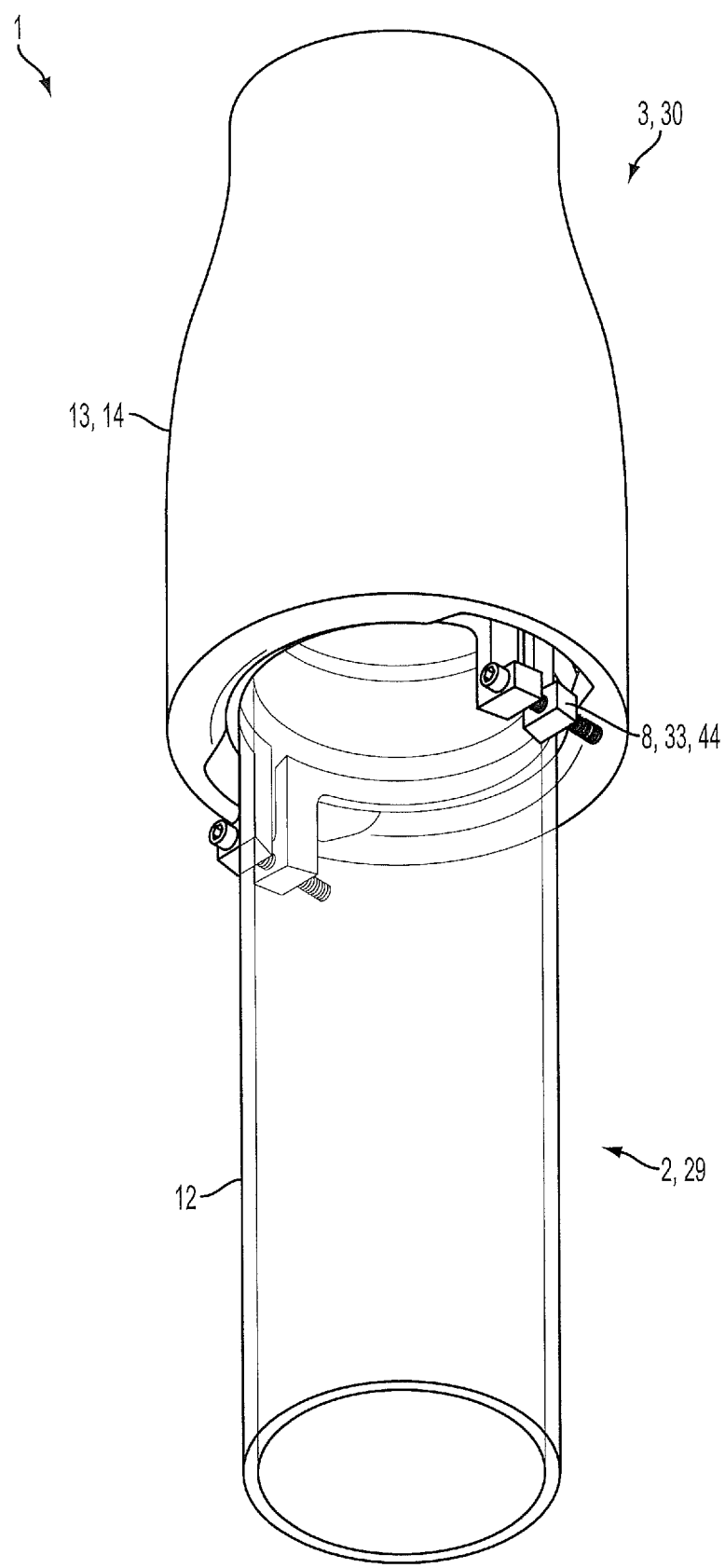
FIG. 7: An embodiment of the joint in which the locking ring segment is a split ring configuration.

The locking ring segment 8 may be a split ring 44 (as shown in FIG. 7). Split rings 44 have the advantage of ease of installation, as they readily expand, and can be placed over the male joint member 2 after the male joint member 2 has been assembled with the female joint member 3. In some such embodiments, the ring is a single-split ring having one gap. If the locking ring segments 8 take the form of a split ring 44, it may further comprise opposed locking flanges to allow adjustment of the width of the gap(s) and to allow tightening or loosening of the ring 44 on the male joint member 2. The single-split ring has the advantage of having only a single pair of opposed locking flanges at the notch 20. In embodiments of the joint comprising a split ring 44 having locking flanges, the notch 20 or notches may accommodate the flanges.

The unobstructed reverse taper region 10 is proximal to the first constriction 5 (on the opposite side of the first constriction as the first groove 9). The reverse taper region 10 is "unobstructed" in that the male joint member 2 is not obstructed from sliding into this region until the raised stop 4 encounters the first constriction 5. The unobstructed reverse taper region 10 increases in diameter in the proximal direction (i.e., it has a second regional diameter that is greater than or equal to the first constriction diameter and which increases in the proximal direction). In some embodiments of the reverse taper region 10 the second regional diameter increases in a linear fashion in the proximal direction. This results in a thinning of the wall of the female joint member 3 in this region, but has the advantage of allowing greater deflection between the male joint member 2 and the female joint member 3 when the male joint member 2 is inserted to an extent that at least a portion of the male joint member 2 extends into the reverse taper region 10 (in many embodiments of the joint 1, such as the ones illustrated in FIGS. 2 and 6, a portion of the male joint member 2 will always extend into the reverse taper region 10 when functioning and properly installed). This additional flexibility further increases separation resistance during extreme events.

The second constriction 60 is proximal to the unobstructed reverse taper region 10. The second constriction 60 has a diameter that is smaller than the outer diameter of the male joint member 2 such that the spigot mouth 61 of the male joint member 2 cannot pass the second constriction 60. In many embodiments, the second constriction 60 is cast as part of the integral shape of the female joint member 3. In some embodiments, the second constriction 60 may be machined into the inner surface 6 of the female joint member 3 after fabrication. In other embodiments, the second constriction 60 is formed by one or more separate structures that are fastened to the inner surface 6 of the female joint member 3. The second constriction 60 may be continuous or interrupted, so long as the interruptions do not interfere with the preventing the spigot mouth 61 from passing.

To enhance the ease of assembling the joint 1 in an intermediate position, the joint 1 includes one or more compressible spacers 50 that are located between the male joint member 2 and the female joint member 3. The compressible spacer 50 is designed to withstand the forces associated with assembly so that normal assembly forces cannot insert the male joint member 2 into the female joint member 3 farther than the intermediate position. Various excavating equipment may be used to assist with the assembly of joints 1 (i.e. used to push the male joint member 2 into the female joint member 3), a common example being a 30- to 40-ton excavator. But other machines such as a backhoe may be used. Table 1 provides the digging force associated with various models of such excavators.

TABLE 1

Digging force associated with various models of 30- to 40-ton excavators. Source: www.constructionequipment.com/smarter-excavators-toughen

| Model | Arm Digging Force (lbs.) |
|---|---|
| John Deere 270C LC | 26,067 |
| Komatsu PC270LC-7 | 33,290 |
| Hitachi Zaxis 270LC | 26,000 |
| Liebherr R934B | 27,500 |
| Caterpillar 325C L | 26,200 |
| Volvo EC290B LC | 30,340 |
| Link-Belt 290LX | 25,850 |
| Case CX290 | 28,101 |
| Daewoo Solar 300LC-V | 29,500 |
| Hyundai R290LC-7 | 30,310 |
| Hyundai R320LC-7 | 32,470 |
| Komatsu PC308USLC-3 | 30,640 |
| JCB JS330 | 29,547 |
| John Deere 330C LC | 37,396 |
| Hitachi Zaxis 330LC | 37,000 |
| Komatsu PC300LC-7 | 37,040 |
| Volvo EC330B LC | 38,810 |
| Daewoo Solar 340LC-V | 38,400 |
| Liebherr R944B | 31,680 |
| Caterpillar 330C L | 36,300 |
| Link-Belt 330LX | 36,850 |
| Case CX330 | 36,846 |
| Hyundai R360LC-7 | 37,280 |

The ability of the compressible spacer 50 to withstand compressive forces is expressed as the strain experienced by the spacer 50 under a specified compressive force. Strain for a particular force level is calculated by dividing the displacement distance under that force by the original axial length of the compressible spacer. In one embodiment, the compressible spacer 50 experiences strain of less than 0.25 under a compressive force of 33 Kip (147 kN), which is greater than the force associated with many 30- to 40-ton excavators that are used to assist with assembly. In another embodiment, the compressible spacer 50 experiences strain of less than 0.25 under a compressive force of at least about 40 Kip (178 kN). In other embodiments, the compressible spacer 50 experiences strain of less than 0.25 under a compressive force equal to the maximum force of a piece of excavating equipment used for assembly of the joint 1. The piece of excavating equipment may be an excavator, a backhoe, or other machine used to install underground piping so long as the machine has an implement that can push together the male joint member 2 and female joint member 3.

When a joint 1 includes a compressible spacer 50, the raised stop 4 is installed at an intermediate position, which is between the first constriction 5 and the first groove 9 but not abutting either structure. Specific embodiments of the intermediate position may be expressed as a ratio between the distance from the raised stop 4 to the first constriction 5 and the distance from the first groove 9 to the first constriction 5. Examples of intermediate positions include where the ratio is 10%, 20%, 25%, 30%, 35%, 40%, 50%, a range between any two of the foregoing values, or no greater than any of the foregoing values. In a specific embodiment, the ratio is 33%, which means that the raised stop 4 is inserted into the female joint member 3 two thirds of the distance between the first groove 9 and the first constriction 5. Ordinarily, it is preferred that the intermediate position is located closer to the first constriction 5 rather than the first groove 9 because the joint 1 is more likely to fail due to tension rather than compression and this position allows the joint 1 to travel further due to tension forces.

In some embodiments, the compressible spacer 50 is designed to allow significant compression of the joint 1 when extreme compressive forces are applied to the joint 1. Preferably, the compressible spacer 50 will compress to allow significant axial displacement under a compressive force that is less than the compressive force at which the joint 1 may fail. The force at which a joint may be expected to fail can be determined by calculating the compressive load capacity (CLC) of the male joint member 2, which requires reference to the proportional limit (a) of the material comprising the male joint member 2. The proportional limit is the highest stress at which stress is directly proportional to the strain. The compressive load capacity is equal to the proportional limit times the minimum cross-sectional area of the male joint member 2. For embodiments where male joint member 2 comprises a hollow cylinder, the compressive load capacity may be calculated using the following formula:

$$CLC = \sigma \times \pi \times (R^2 - (R-t)^2)$$

where $\pi$ is equal to the value of pi (approximately 3.14), "R" is equal to the minimum outer radius of the male joint member 2, and "t" is equal to the minimum wall thickness of the male joint member 2.

In some embodiments, the compressible spacer 50 experiences strain of at least 0.5 under a compressive force equal to one half of the compressive load capacity of the joint 1. For instance, for a joint 1 comprising a male joint member 2 that is a 6 inch ductile iron pipe, which has a minimum outer radius "R" of 3.42 inches, a minimum wall thickness "t" of 0.29 inches, and a proportional limit (a) of 39,500 lbs/in$^2$, the calculations may be performed as follows: First calculate the value of the minimum outer radius squared, which is 11.70 in$^2$. Second calculate the radius of the inner wall by subtracting the minimum wall thickness from the minimum outer radius, which is 3.13 inches. Third, calculate the value of the inner wall radius squared, which is 9.80 in$^2$. Fourth, calculate the minimum cross-sectional area by subtracting the inner wall radius squared from the minimum outer radius squared and multiply by pi ($\pi$), which is 5.97 in$^2$. Fifth, calculate the compressive load capacity by multiplying the minimum cross-sectional area by the proportional limit, which results in a compressive load capacity of 235,714 lbs. Therefore, one embodiment of the compressible spacer 50 used with 6 inch ductile iron pipe experiences strain of at least 0.5 under a compressive force equal to half of the compressive load capacity, or 117,857 lbs (118 Kip or 525 kN). Exemplary calculations for other sizes of ductile iron pipe are provided in table 2.

TABLE 2

Exemplary calculations of compressive load capacity for various sizes of ductile iron pipe.

| Size (in) | Min. Outer Radius (in) | Min. Wall Thickness (in) | Prop. Limit (lbs/in$^2$) | R$^2$ (in$^2$) | (R-t)$^2$ (in$^2$) | Area (in$^2$) | Approx. CLC (lbs) | CLC/2 (lbs) |
|---|---|---|---|---|---|---|---|---|
| 4  | 2.37  | 0.27 | 39,500 | 5.62   | 4.41   | 3.79  | 149,768   | 74,884  |
| 6  | 3.42  | 0.29 | 39,500 | 11.70  | 9.80   | 5.97  | 235,714   | 117,857 |
| 8  | 4.50  | 0.31 | 39,500 | 20.21  | 17.51  | 8.45  | 333,909   | 166,955 |
| 10 | 5.52  | 0.32 | 39,500 | 30.47  | 27.04  | 10.78 | 425,688   | 212,844 |
| 12 | 6.57  | 0.34 | 39,500 | 43.16  | 38.81  | 13.67 | 540,052   | 270,026 |
| 14 | 7.61  | 0.35 | 39,500 | 57.91  | 52.71  | 16.35 | 645,842   | 322,921 |
| 16 | 8.66  | 0.36 | 39,500 | 75.00  | 68.89  | 19.18 | 757,662   | 378,831 |
| 18 | 9.71  | 0.37 | 39,500 | 94.28  | 87.24  | 22.14 | 874,669   | 437,334 |
| 20 | 10.76 | 0.38 | 39,500 | 115.78 | 107.74 | 25.24 | 996,863   | 498,432 |
| 24 | 12.86 | 0.40 | 39,500 | 165.38 | 155.25 | 31.82 | 1,256,813 | 628,406 |

The advantage to this particular embodiment is that the male 2 and female 3 joint members may be axially displaced relative to each other in either direction when a compressive or tension force is applied to the joint 1. In particular, when an extreme compressive force is applied to the joint 1, the male 2 and female 3 joint members will axially displace before the compressive force reaches the compressive load capacity of the male joint member 2. In extreme events, this ability to axially displace in either direction should reduce the amount of compressive or tension force experienced by the joint 1, which increases the likelihood that the joint 1 will withstand extreme events.

Optionally or alternatively, the compressible spacer 50 may deteriorate during the service life of the joint 1. This characteristic of the spacer 50 is desirable because the purpose of the compressible spacer 50 is to withstand the compressive forces associated with assembly and not to impede significant compression of the joint 1 during an extreme event. Thus, a compressible spacer 50 may be constructed from any suitable material that is biodegradable, dissolvable, or otherwise impermanent. Using a compressible spacer 50 constructed from such materials allows the joint 1 to achieve many of the advantages of prior art systems that do not use compressible spacers 50 while also achieving the advantage of easier assembly of the joint 1 in an intermediate position. For instance, after the compressible spacer 50 has significantly biodegraded or dissolved, the compressible spacer 50 is no longer rigid and therefore unable to extrude into the gasket 7 or the inner conduit when an extreme compressive force is applied to the joint 1. However, because a compressible spacer 50 constructed from an impermanent material may not appreciably deteriorate for many months or years, it is often desired that the compressible spacer 50 be constructed to allow significant axial displacement when an extreme compressive force is applied to the joint 1. Thus, a contemplated embodiment of a compressible spacer 50 constructed from an impermanent material will experience strain of at least 0.5 under a compressive force equal to one half of the compressive load capacity of the joint 1, as described above.

One skilled in the art will recognize that various designs and configurations of compressible spacers 50 may be employed to achieve the characteristics and properties described above. The following configurations and design options are intended to be exemplary configurations that may achieve the desired properties. One skilled in the art will recognize, however, that various other configurations and designs may be used to achieve substantially the same result.

In one embodiment, the compressible spacer 50 is an intermediate compressible spacer 51. The intermediate compressible spacer 51 is located between the raised stop 4 and the first constriction 5. The intermediate compressible spacer 51 is positioned so that when the joint 1 is compressed, such as during assembly, the intermediate spacer 51 contacts the raised stop 4. The intermediate compressible spacer 51 is dimensioned so that it also contacts the first constriction 5 or some other structure on the inner surface 6 of the female joint member 3 (i.e. the intermediate spacer 51 does not easily pass beyond the first constriction 5) when the joint 1 is compressed. Thus, when the intermediate compressible spacer 51 contacts both the raised stop 4 and a structure on the inner surface 6, the intermediate spacer 51 provides resistance to further compression of the joint 1. During assembly, this increased resistance indicates that the raised stop 4 has reached the intermediate position. The intermediate compressible spacer 51 has the advantage that the compressible spacer 50 is outside of the inner conduit by virtue of its location relative to the gasket 7. Because the intermediate compressible spacer is not exposed to any fluids carried through the inner conduit, the material used for the intermediate compressible spacer 51 may be excused from complying with certain standards that would otherwise apply. For instance, for joints used in connection with systems supplying water (including freshwater and wastewater), the intermediate compressible spacer 51 may comprise a material that does not comply with the standards promulgated by the American Water Works Association or other applicable standards.

In another embodiment, the compressible spacer 50 comprises a terminal compressible spacer 52. The terminal compressible spacer 52 is located between the spigot mouth 61 and the second constriction 60, and the terminal compressible spacer 52 is positioned so that, when the joint 1 is compressed, the terminal spacer 52 contacts the spigot mouth 61. The terminal compressible spacer 52 is dimensioned so that it also contacts the second constriction 60 or some other structure on the inner surface 6 (i.e. the terminal spacer 52 does not easily pass beyond the second constriction 60) when the joint 1 is compressed. Thus, similar to the intermediate compressible spacer 51, the terminal compressible spacer 52 provides resistance to further compression of the joint 1 when the terminal spacer 52 contacts both the spigot mouth 61 and the inner surface 6. This increased resistance to compression indicates that the raised stop 4 has reached the intermediate position. The terminal compressible spacer 52 has the advantage that inspectors may more easily identify a joint 1 that has experienced an extreme event because the terminal compressible spacer 52 will extrude into the inner conduit under extreme compressive forces. The extrusion of the terminal compressible spacer 52 can be detected easily using cameras that inspectors commonly use to inspect a system comprising a plurality of joints 1. An additional advantage of this embodiment is that, when a compressive force is applied to the joint, the terminal compressible spacer 52 cannot damage the raised stop 4 because it does not contact the raised stop 4. Therefore, in an extreme event where the terminal compressible spacer 52 may allow significant compression of the joint 1, the raised stop 4 is fully intact to contact the first constriction 5.

In some embodiments, the compressible spacer 50 comprises an arc of a ring. In other embodiments, the joint 1 may comprise a plurality of compressible spacers 50 that form an interrupted circumferential arc. Preferably, the arc of the ring or the interrupted circumferential arc is at least 340°, as this provides maximum stability and resistance of the joint 1 to compressive forces. It is to be understood by one skilled in the art, however, that compressible spacers 50 of other shapes may be used so long as those spacers 50 are dimensioned to provide sufficient resistance to compression under normal assembly forces.

In one embodiment, the compressible spacer 50 comprises an arc of a ring that has a cross section consisting essentially of a rectangular shape. Examples of this cross section are provided in FIG. 15. The cross section is taken by intersecting the ring with a plane that contains the axis of the female joint member 3. The sides of the cross section are formed by the outer surface 70, the proximal surface 71, the inner surface 72, and the distal surface 73 of the compressible spacer 50. In some embodiments, the shape of the cross section is modified to increase or decrease the ability of the compressible spacer 50 to withstand compressive forces. For instance, the cross section has a first corner 75 where the outer surface 70 meets the proximal surface 71 and a second corner 76 where the inner surface 72 meets the distal surface 73. When the joint 1 is assembled, the first corner 75 ordinarily contacts a portion of the inner surface 6 of the female joint member 3. By modifying the shape of the first corner 75, the compressible spacer 50 may contact an increased surface area of the inner surface 6 (which increases the ability of the compressible spacer 50 to withstand compressive forces) or a decreased surface area of the inner surface 6 (which decreases the ability of the compressible spacer 50 to withstand compressive forces). Examples of shapes of the first corner 75 include a sharp corner 80, chamfered corner 81, rounded corner 82, or other shape. In embodiments of the joint 1 where the compressible spacer 50 is an intermediate compressible spacer 51 and the inner surface 6 comprises a surface that slopes linearly to the first constriction 5, the first corner 75 may be chamfered to complement the slope of the surface 6 leading to the first constriction 5. In this embodiment, the chamfered corner 81 increases the surface area of the inner surface 6 contacted by the compressible spacer 50 and, in turn, increases the ability of the compressible spacer 50 to withstand compressive forces. Alternatively, in embodiments of the joint comprising a terminal compressible spacer 52, the inner surface 6 near the second constriction 60 may be rounded, and the first corner 75 may comprise a rounded corner 82 that complements the shape of the inner surface 6.

In some embodiments the shape of the second corner 76 may be modified. The second corner 76 ordinarily contacts the male joint member 2, and in embodiments where the compressible spacer 50 comprises an intermediate compressible spacer 51, the second corner 76 contacts the raised stop 4. The second corner 76 may comprise a sharp corner 80, chamfered corner 81, rounded corner 82, or other shape. Similar to the first corner 75, in some embodiments, the second corner 76 may be selected to complement the shape of the raised stop 4, thereby increasing the surface area contacted by the compressible spacer 50. In other embodiments, where it is desirable to decrease the ability of the compressible spacer 50 to withstand compressive forces, the second corner 76 may be selected to decrease the surface area contacted by the compressible spacer 50. This design may be desired in some embodiments, particularly those using an intermediate compressible spacer 51, so that, when a compressive force is applied, the first deformation of the compressible spacer 51 occurs near the raised stop 4 rather than near the first constriction 5 (which could result in extrusion of the intermediate compressible spacer 51 through the first constriction 5 and into the gasket 7).

In yet other embodiments, the shape of the distal surface 73 of the compressible spacer 50 may be modified. Similar to modifications of the first 75 and second 76 corners, modifications to the distal surface 73 may alter the amount of surface that the compressible spacer 50 contacts on the raised stop 4. In some embodiments, the distal surface 73 may have a concave contour 83, but the distal surface 73 may also be flat, have a convex contour, or comprise another shape. In embodiments comprising a terminal compressible spacer 52, the distal surface 73 may have a concave contour 83 that complements the shape of the spigot mouth 61 of the male joint member 2. This embodiment has the advantage that the male joint member 2 will more easily stay centered on the terminal compressible spacer 52, which maintains the ability of the compressible spacer 52 to withstand compressive forces.

The foregoing variations of the compressible spacer 50 having a rectangular cross section may be used individually or combined. In one embodiment, the first corner 75 comprises a chamfered corner 81 and the second corner 76 comprises a rounded corner 82. In another embodiment, the first corner 75 comprises a chamfered corner 81 and the distal surface 73 has a concave contour 83. One skilled in the art will appreciate that these and a variety of other combinations may be used to achieve similar results.

Figure 14:
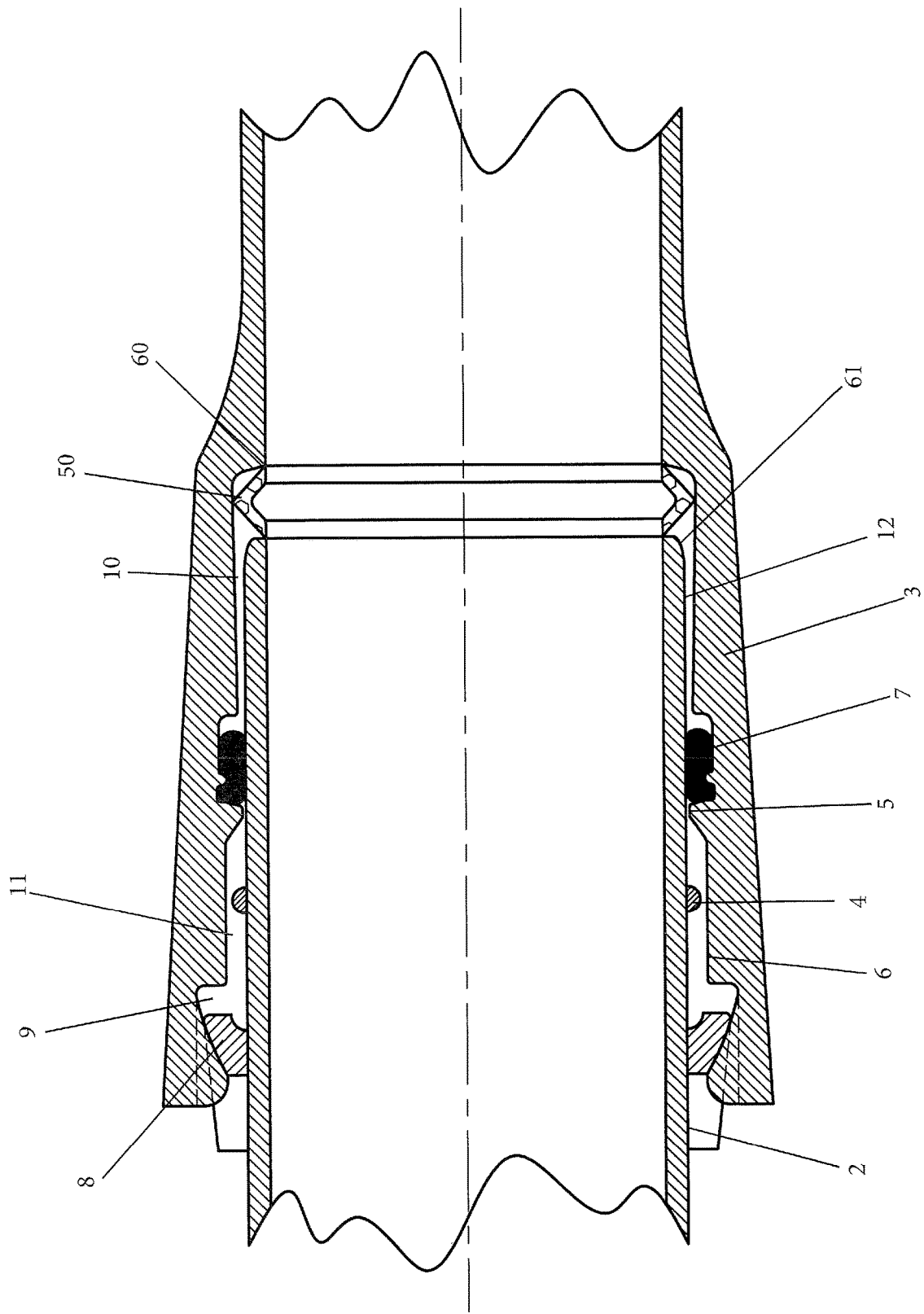
FIG. 14: A cross-sectional view of an embodiment of the joint wherein the compressible spacer is the terminal compressible spacer with a triangular cross section.
Figure 15A:
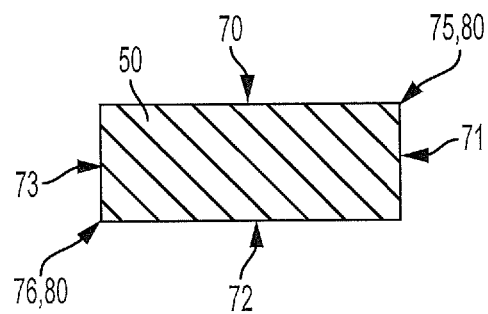
FIG. 15: Cross-sectional detail of five embodiments of the compressible spacer in which the spacer has a cross section consisting essentially of a rectangular shape. 15A shows an embodiment of the compressible spacer in which the first corner is a sharp corner and the second corner is a sharp corner. 15B shows an embodiment of the compressible spacer in which the first corner is a chamfered corner and the second corner is a sharp corner. 15C shows an embodiment of the compressible spacer in which the first corner is a rounded corner and the second corner is a sharp corner. 15D shows an embodiment of the compressible spacer in which the first corner is a sharp corner and the second corner is a rounded corner. 15E shows an embodiment of the compressible spacer in which the first corner is a chamfered corner and the distal surface has a concave contour.
Figure 15B:
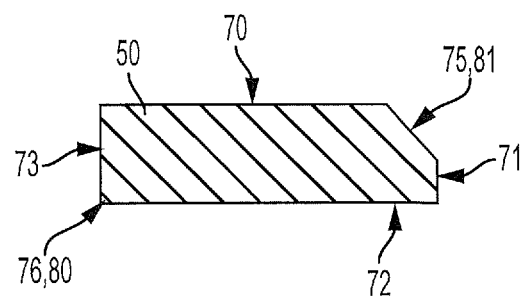
Figure 15C:
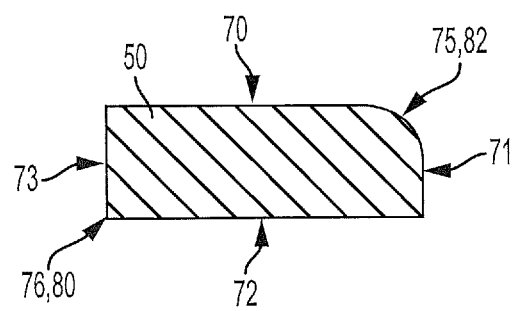
Figure 15D:
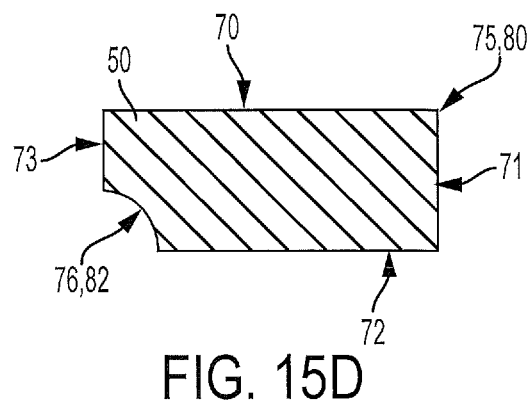
Figure 15E:
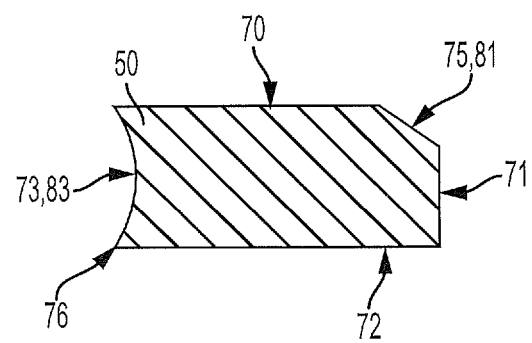
Figure 16:
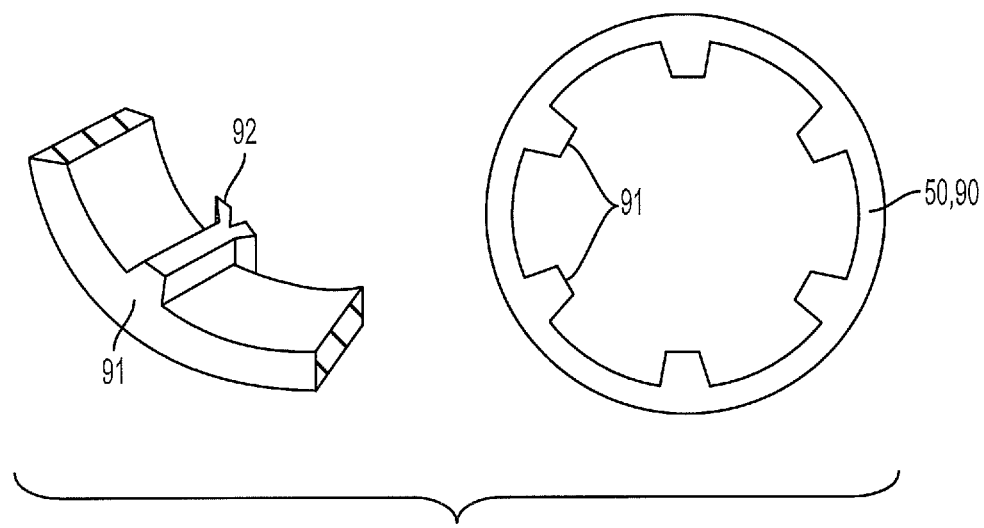
FIG. 16: An embodiment of a compressible spacer comprising a metal alloy in which the spacer has a toothed design and the teeth have a Y shape.

One skilled in the art will likewise appreciate that compressible spacers 50 having other types of cross sections may be used. For instance, an intermediate compressible spacer 51 may have a cross section consisting essentially of a semicircular arc shape. An example of semicircular arc cross section is provided in FIG. 13; however, other variations of a semicircular shape may be used. For instance, the inner surface 72 of the intermediate compressible spacer may be flat instead of including an arced surface. Similarly, the circle defining the inner surface 72 may be non-concentric with the circle defining the outer surface 70 of the inner compressible spacer 51. In such an embodiment, the inner compressible spacer 51 will have varying thickness throughout the arc of the cross section of the intermediate spacer 51. In another embodiment, a terminal compressible spacer 52 may have a cross section consisting essentially of a triangular shape, such as that shown in FIG. 14. As with the semicircular arc shape, the inner surface 72 of the terminal compressible spacer 52 may be flat, concave, or convex in shape. For instance, as shown in FIG. 14, the inner surface may be concave in shape, with a triangle defining the shape of the inner surface 72.

The compressible spacer 50 may comprise any suitable material that has sufficient strength to withstand the forces associated with assembly. Examples of materials include polyvinyl chloride, polyoxymethylene, acetal homopolymer, polyamide, polyethylene terephthalate, polycarbonate, and acrylonitrile-butadiene-styrene. Some of these particular materials have the advantage that some suppliers already offer versions that comply with applicable regulations for use with providing water services, including freshwater. The compressible spacer 50 may be cast into the desired shape, the spacer 50 may be machined to have the desired characteristics, or any other well-known method may be used to form the compressible spacer 50.

The compressible spacer 50 may alternatively be constructed from biodegradable, dissolvable, or other impermanent material. Examples of biodegradable materials include polyactic acid and varieties of wood, such as domestic pine and some hardwoods. Examples of dissolvable materials include polyvinyl alcohol, cellulose, medium density fiberboard, sodium chloride, and oatmeal. The materials may be compressed into shape or optionally bonded using a resin or glue to retain their temporary shape for use during installation of the joint 1.

Alternatively, the compressible spacer 50 may comprise a metal alloy such as aluminum. In embodiments with a compressible spacer 50 comprising aluminum, the compressible spacer 50 should be designed so that the compressible spacer 50, and not the raised stop 4, will experience deformation under extreme compressive forces. For instance, in some embodiments, the compressible spacer 50 comprises a shape 90 designed to contact less than half of the surface area of the raised stop 4. The shape may include a structure that is a "toothed" design, wherein only the teeth 91 of the compressible spacer 50 contact the raised stop 4. Additionally or alternatively, the structure of the spacer 50 that contacts the raised stop 4, such as the teeth 91, may include features to ensure that the structure deforms under an extreme compressive force before the raised stop 4 deforms. For instance, in some embodiments, the teeth 91 are "Y" shaped (or "forked" on one end) so that, when an extreme compressive force is applied to the joint, the teeth 91 begin deforming near the forked end before the raised stop 4 is damaged. One skilled in the art will appreciate that any number of other designs may be used to ensure that the compressible spacer 50 will deform before the raised stop 4.

In some embodiments of the joint 1 where the compressible spacer 50 is the intermediate compressible spacer 51, the female joint member 3 comprises a second circumferential groove 55 on the inner surface 6 between the first circumferential groove 9 and the first constriction 5. The female joint member 3 may be fabricated with the second groove 9 as an integral part, the second groove 9 may be made in the inner surface 6 of the female joint member 3 after fabrication, or the second groove 9 may be formed by one or more separate structures that are fastened to the inner surface 6. In one embodiment, the second circumferential groove 55 has a first surface 56 approximately perpendicular to the axis of the female joint member 3. In this embodiment, the intermediate compressible spacer 51 may optionally have a proximal surface 71 that is approximately perpendicular to the axis of the female joint member 3 such that the proximal surface 71 is flush with the first surface 56 when the joint 1 is assembled. This embodiment has the advantage that the intermediate compressible spacer 51 contacts a greater amount of surface area of the inner surface 6, which allows the intermediate compressible spacer to withstand greater forces than embodiments without a first surface 56 approximately perpendicular to the axis of the female joint member 3. This embodiment may optionally have a first corner 75 comprising a sharp corner 80, which has the advantage of further increasing the surface area of the inner surface 6 contacted by the intermediate compressible spacer 51.

In some embodiments, the compressible spacer 50 has a specific radial width or diameter to improve the fit of the compressible spacer 50 in the joint 1. For instance, in an embodiment where the compressible spacer 50 is an intermediate compressible spacer 51, the intermediate compressible spacer 51 has an inner diameter marginally greater than the outer diameter of the male joint member 2. This embodiment makes assembly easier and also increases the contact area of the compressible spacer 51 with the raised stop 4. In other embodiments, the intermediate compressible spacer 51 may have a radial width marginally less than half of the difference between the first regional diameter minus the outer diameter of the male joint member 2. Alternatively, in embodiments where the female joint member 3 comprises a second circumferential groove 55, the second groove 55 may have a second surface 57. In this embodiment, the intermediate compressible spacer 51 may have a radial width that is marginally less than the difference between the distance from the axis of the female joint member 3 to the second surface 57 minus half of the outer diameter of the male joint member 2. The advantage of either of these embodiments is that the compressible spacer 51 has the maximum surface area available to contact the inner surface 6 and raised stop 4, is less likely to extrude into vacant space between the compressible spacer and the female 3 or male 2 joint member, and fits snuggly in the second circumferential groove 55 to aid in the process of assembly. In other embodiments where the compressible spacer 50 is a terminal compressible spacer 52, the unobstructed reverse taper region 10 has a proximal diameter where the reverse taper region 10 meets the second constriction 60 and the terminal compressible spacer 52 has an outer diameter that is approximately equal to the proximal diameter. This embodiment has the advantage that the terminal compressible spacer 52 will more readily maintain its position once it is installed in the female joint member 3. Furthermore, in some of embodiments, the terminal compressible spacer 52 may have a radial width of no less than half of the difference between the proximal diameter and the inner diameter of the male joint member 2. This embodiment is advantageous because it maximizes the surface area of the terminal compressible spacer 52 available to contact the spigot mouth 61 without the compressible spacer 52 intruding into the inner conduit, where it might otherwise impact the flow of fluids through the conduit.

The joint 1 may comprise a low-friction polymer layer surrounding the joint 1. The polymer may be any suitable low-friction polymer, such as polyethylene or polyurethane. The layer may take the form of a bag that is placed around the joint 1 during or before installation. It may also take the form a sheet that is wrapped around the joint 1 during or before installation. Additional forms of the layer, such as a coating or a barrier, are also contemplated.

C. Method of Assembly

Methods of assembling a separation-resistant pipe joint 1 are provided, in which the pipe joint 1 comprises any of the female pipe joint members 3, male joint members 2, compressible spacers 50, and locking ring segments 8 described above; the female pipe joint member 3 comprising a notch 20 that widens the socket mouth 21 of the female joint member 3 over an arc of less than 180°. In one method, wherein the compressible spacer 50 is an intermediate compressible spacer 51, the method comprises: (a) placing the compressible spacer 51 around the outer surface of the male joint member 2 and between the raised stop 4 and the spigot mouth 61; (b) inserting the male joint member 2 and the compressible spacer 51 into the female joint member 3 until the compressible spacer contacts the first constriction 5 of the female joint member 3 and contacts the raised stop 4 of the male joint member 2; (c) inserting the locking ring segment 8 into the notch 20; and (d) sliding the locking ring segment 8 into the first circumferential groove 9 so that most of the locking ring segment 8 is no longer in the notch 20. In another method, wherein the compressible spacer 50 is a terminal compressible spacer 52, the method comprises: (a) placing the compressible spacer 52 inside of the female joint member 3 and abutting the second constriction 60; (b) inserting the male joint member 2 into the female joint member 3 until the spigot mouth 61 contacts the compressible spacer 52; (c) inserting the locking ring segment 8 into the notch 20; and (d) sliding the locking ring segment 8 into the first circumferential groove 9 so that most of the locking ring segment 8 is no longer in the notch 20.

Conversely, a method of disassembling the joint 1 is provided, comprising: (a) sliding the locking ring segment 8 out of the first circumferential groove 9 so that the locking ring segment 8 is no longer in the notch 20; (b) removing the locking ring segment 8 from the notch 20; and (c) removing the male joint member 2 from the female joint member 3.

In some embodiments the joint 1 will include a second locking ring segment 36. In such embodiments the method may comprise inserting the second locking ring segment 36 into the notch 20, the second locking ring segment 36 having a shape complementary to the shape of the first circumferential groove 9, and the second locking ring segment 36 defining a circumferential arc 28 that is smaller than the arc of the notch 20; and sliding the second locking ring segment 36 into the first circumferential groove 9 so that most of the second locking ring segment 36 is no longer in the notch 20. Three locking ring segments 8, 36 and 37 may also be inserted (or more). As noted above, the use of more than one locking ring segment 8 can provide greater contact area between the locking ring segment 8 and the raised stop 4 and between the locking ring segment 8 and the first circumferential groove 9, without requiring an increase in the size of the notch 20 to insert the locking ring segments 8. In a specific embodiment, the method comprises inserting at least three locking ring segments 8, 36 and 37 into the notch 20, each said locking ring segment 8, 36 and 37 defining a circumferential arc 28 of about 90°.

Locking ring segments 8 with tabs 22 may be used for the reasons described above. In some embodiments of the method, the locking ring segment 8 comprises a tab 22 extending axially distally in regard to the female joint member 3, and the tab 22 remains in the notch 20 after sliding the locking ring segment 8 into the first circumferential groove 9. Thus the tab 22 prevents the segment 8 from sliding too far into the first circumferential groove 9 away from the notch 20 and facilitates its easy removal for disassembly purposes. In a specific embodiment, the method comprises inserting the second locking ring segment 36 into the notch 20, the second locking ring segment 36 having a shape complementary to the shape of the first circumferential groove 9, and the second locking ring segment 36 defining a circumferential arc 28 that is smaller than the arc of the notch 20; and sliding the second locking ring segment 36 into the first circumferential groove 9 so that most of the second locking ring 36 segment is no longer in the notch 20; in which the first 8 and second 36 locking ring segments each comprise a tab 22 extending axially distally in regard to the female joint member 3. In a further specific embodiment, the method comprises inserting the second locking ring segment 36 into the notch 20, the second locking ring segment 36 having a shape complementary to the shape of the first circumferential groove 9, and the second locking ring segment 36 defining a circumferential arc 28 that is smaller than the arc of the notch 20; sliding the second locking ring segment 36 into the first circumferential groove 9 so that most of the second locking ring segment 36 is no longer in the notch 20; inserting a third locking ring segment 37 into the notch 20, the third locking ring segment 37 having a shape complementary to the shape of the first circumferential groove 9, and the third locking ring segment 37 defining a circumferential arc 28 that is smaller than the arc of the notch 20; sliding the third locking ring segment 37 into the first circumferential groove 9 so that most of the third locking ring segment 37 is no longer in the notch 20; in which the first 8 and second 36 locking ring segments each comprise a tab 22 extending axially distally in regard to the female joint member 3.

In embodiments of the joint 1 comprising a restraint 15, the method may comprise: fastening the restraint 15 onto the female joint member 3, in which the restraint 15 will fail when exposed to stress exceeding a stress threshold; and fastening the restraint 15 onto the male joint member 2 in a position such that the raised stop 4 remains positioned between the locking ring segment 8 and the first constriction 5. The restraint 15 may be fastened to the male 2 and female 3 joint members by any means known in the art. For example the restraint 15 may be bolted onto one or both members, or welded onto one or both members. The fastening means may be the mechanism by which failure at the stress threshold is achieved, but this may be achieved by others means; a person of ordinary skill in the art could vary the means by which such controlled failure will occur without undue experimentation. In embodiments of the joint in which the restraint comprises a clamp ring 18 and a bolt 16, the method comprises bolting the restraint 15 onto the female joint member 3; and fastening the clamp ring 18 onto the male joint member 3 in a position such that the raised stop 4 remains positioned between the locking ring segment 8 and the first constriction 5. In some such specific embodiments, the bolt 16 is designed to fail above the stress threshold.

In some embodiment of the methods, a piece of excavating equipment is used to aid the process of assembly. The piece of excavating equipment may comprise a 30- to 40-ton excavator as described above, or it may comprise any other excavator, backhoe, or other type of excavating equipment capable of providing sufficient force to insert the male joint member 2 into the female joint member 3. In a specific embodiment, the method comprises using a 30- to 40-ton excavator to insert the male joint member 2 into the female joint member 3.

In some embodiments of the methods, the male joint member 3 is inserted so that the raised stop 4 is a given distance from the first circumferential groove 9. In one such embodiment the ratio of the distance from the first circumferential groove 9 to the raised stop 4 and the distance from the first circumferential groove 9 to the first constriction 5 is selected from: 90%, 80%, 75%, 70%, 65%, 60%, 50%, a range between any two of the foregoing values, or no greater than any of the foregoing values. In a more specific embodiment of the method, the male joint member 2 is inserted such that the ratio of the distance from the first circumferential groove 9 to the raised stop 4 and the distance from the first circumferential groove 9 to the first constriction 5 is about 66%.

The male joint member 2 can be any that is disclosed above as being suitable for use in the joint. In a specific embodiment of the method, the male joint member 2 is a pipe spigot 29, and the raised stop 4 is a weld bead 27; such specific embodiments may comprise applying a weld bead 27 on the outer surface 12 of the male joint member 2 circumferentially prior to inserting the male joint member 2 into the female joint member 3. Of course, the raised stop 4 may be fastened to the male joint member 2 by any other suitable means prior to insertion.

As explained above, some embodiments of the female joint member 3 are attached to a second pipe 31 (in which case the female joint member 3 can be considered a pipe bell 30). In such cases the method may comprise welding the pipe bell 30 onto the second pipe 31 prior to inserting the male joint member 2 into the female joint member 3. Alternatively, it may comprise casting the pipe bell 30 integrally with a second pipe 31 prior to inserting the male joint member 2 into the female joint member 3.

The method may comprise inserting a gasket 7 between the first constriction 5 and the reverse taper region 10. In some embodiments of the method the gasket 7 is inserted into a gasket groove 42 in the female joint member 3.

The method may comprise surrounding the joint 1 with a low-friction polymer layer. The polymer may be any suitable low-friction polymer in any form discussed above. The layer may take the form of a bag that is placed around the joint 1 during or before installation. The method may comprise surrounding the joint 1 before installation, or after installation. One embodiment of the method comprises wrapping the joint 1 in a polymer sheet; another embodiment comprises putting a polymer bag around the joint 1; yet another embodiment comprises applying the polymer layer as a coating on the joint 1.

D. Failure Resistant System

Figure 9:
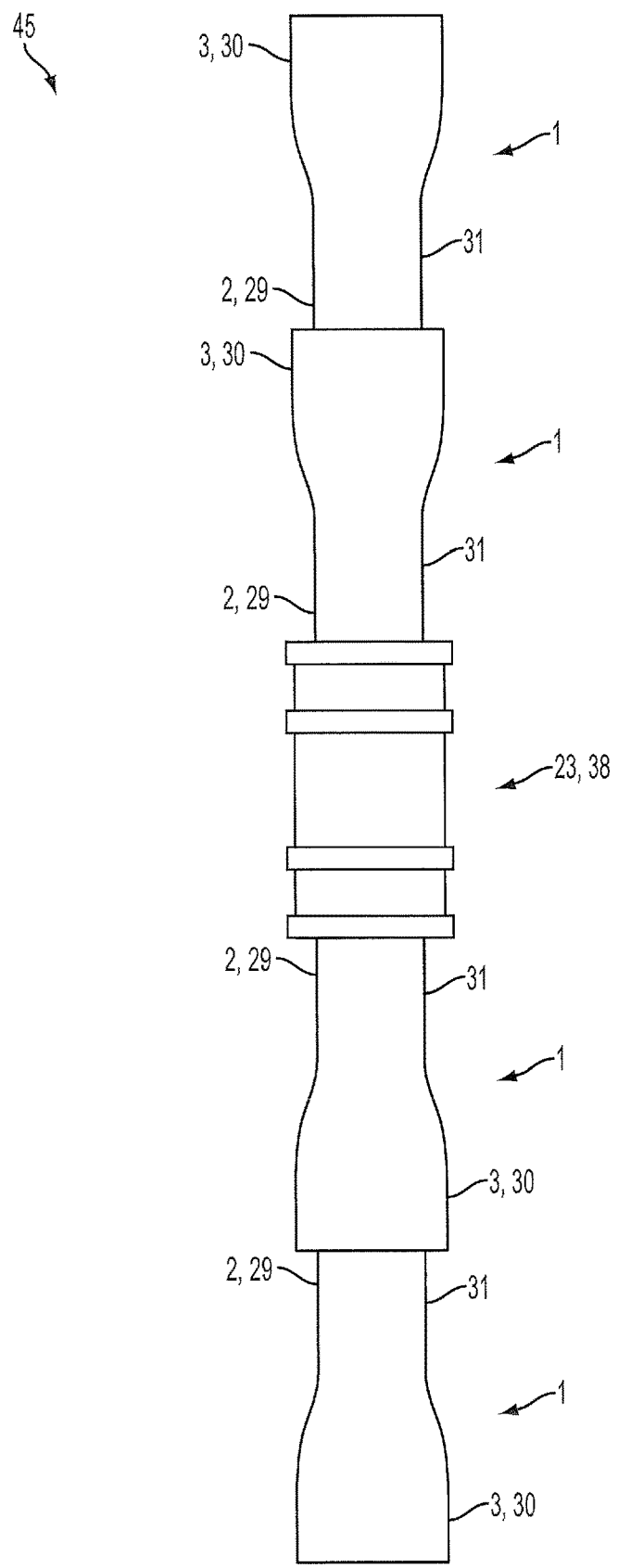
FIG. 9: A plan view of an embodiment of the failure resistant system.
Figure 10:
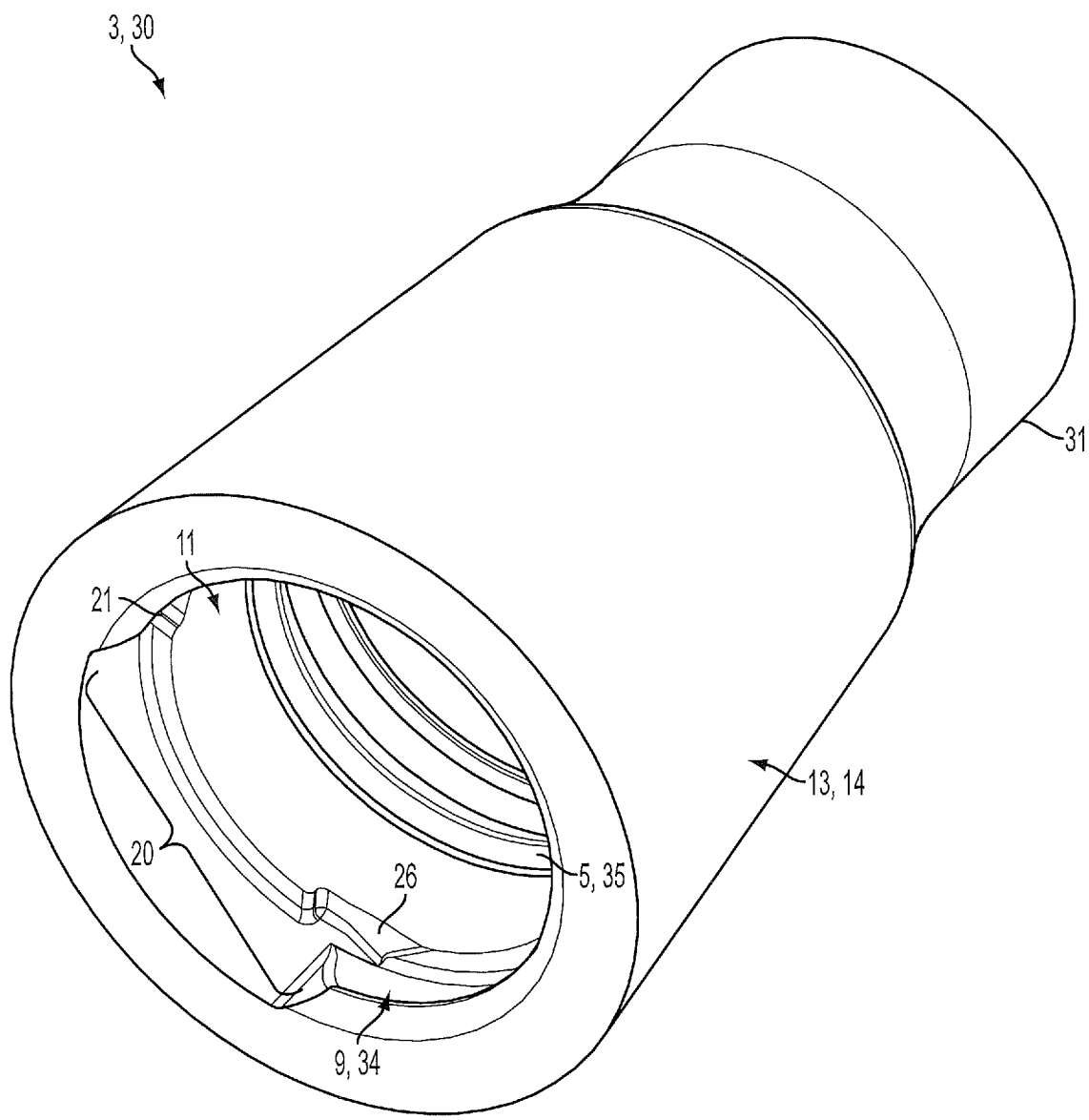
FIG. 10: A perspective view of an embodiment of the joint in which the first groove comprises two depressions in the distal surface, each located at one end of the notch.
Figure 11:
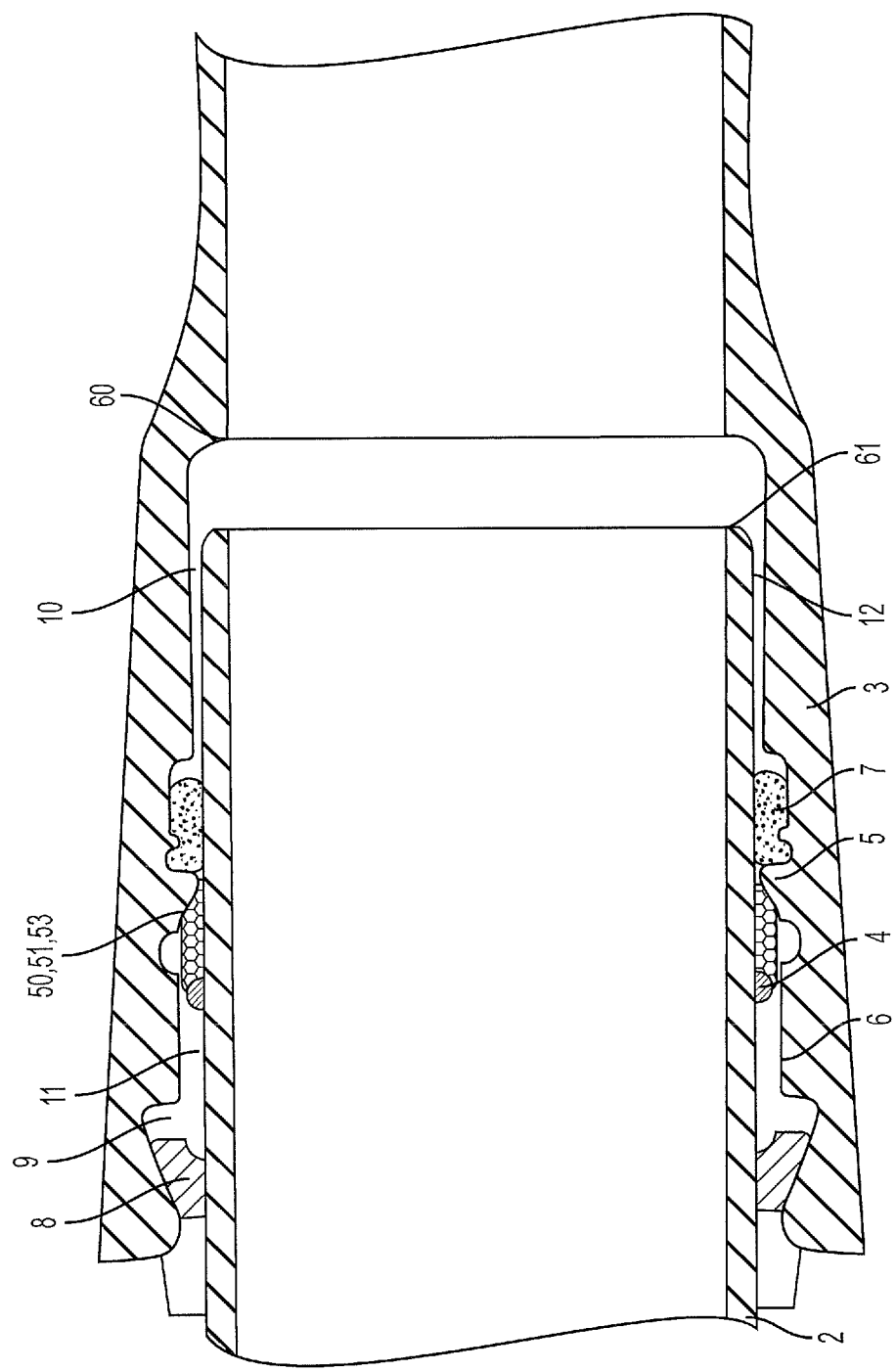
FIG. 11: A cross-sectional view of an embodiment of the joint wherein the compressible spacer is the intermediate compressible spacer with a rectangular cross section.
Figure 12:
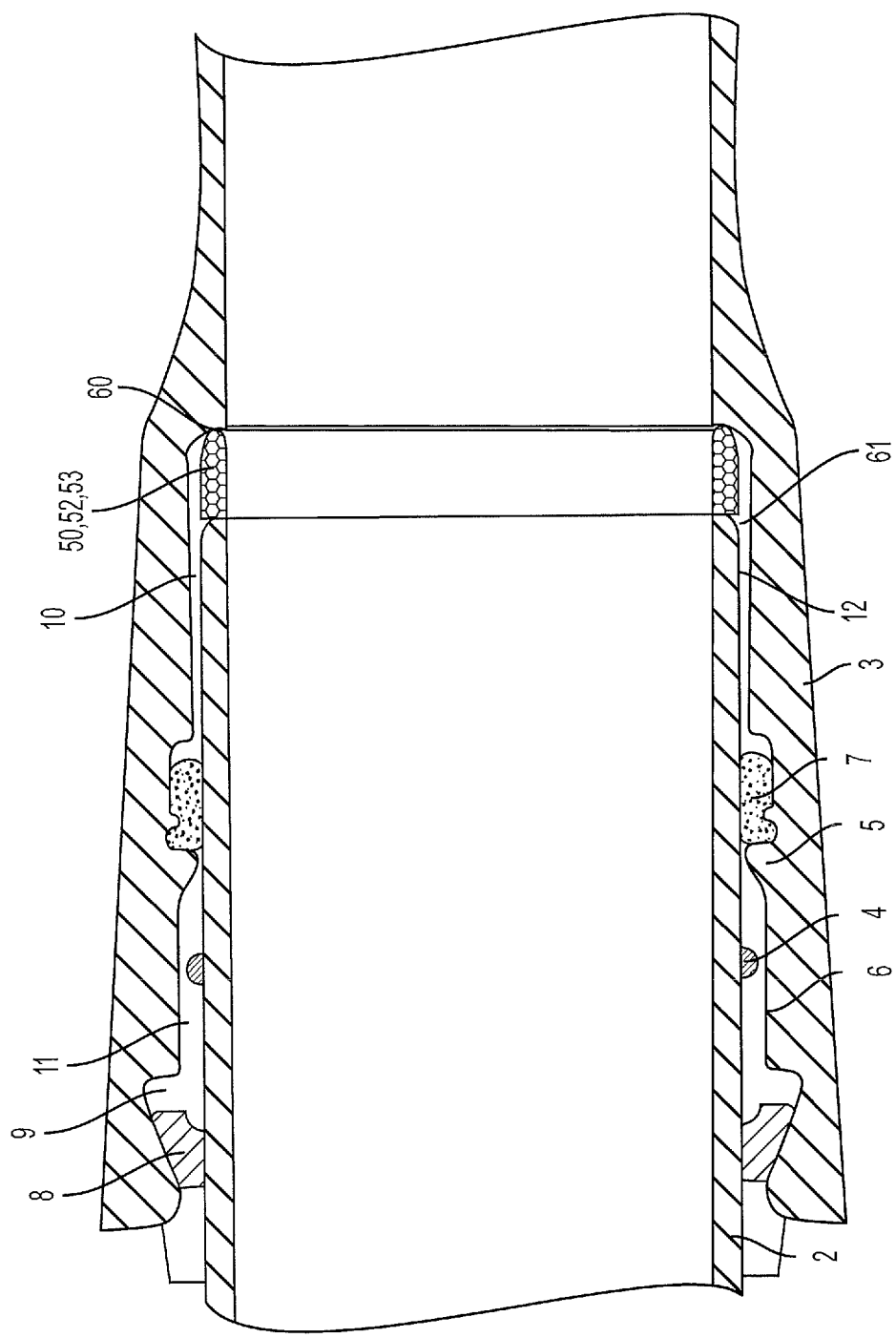
FIG. 12: A cross-sectional view of an embodiment of the joint wherein the compressible spacer is the terminal compressible spacer with a rectangular cross section.
Figure 13:
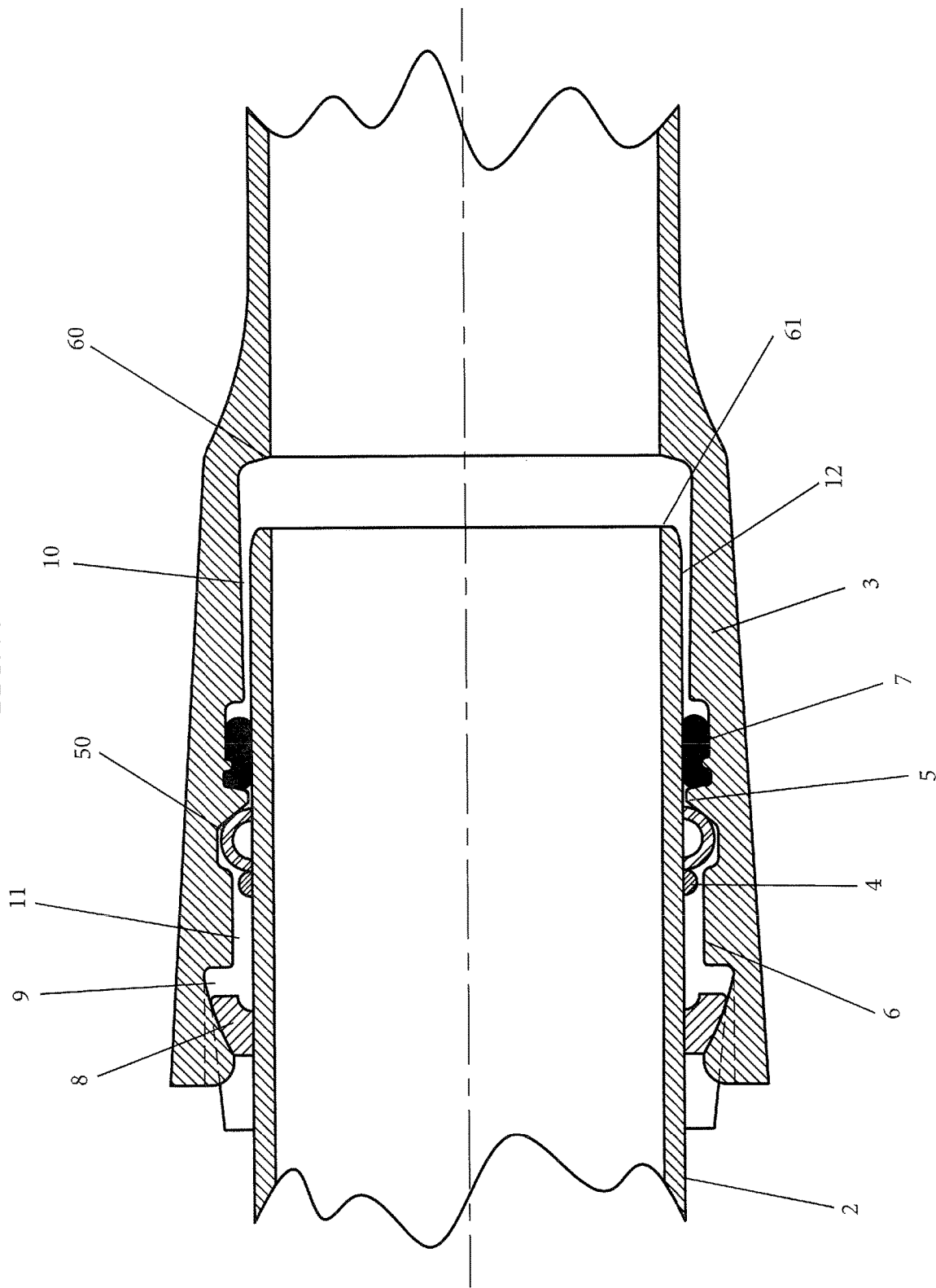
FIG. 13: A cross-sectional view of an embodiment of the joint wherein the compressible spacer is the intermediate compressible spacer with a semicircular arced cross section.

A failure resistant system 45 for delivering a fluid through pipes is provided (an exemplary embodiment of which is shown in FIG. 9). The system 45 is useful in areas subject to violent displacement of the matrix through which the pipes traverse (such as soil and rock). Such violent displacement can occur as a result of earthquakes, landslides, mudslides, and floods. A general embodiment of the system 45 comprises a plurality of the separation-resistant pipe joints 1 described above. The plurality of pipe joints 1 may be mutually connected, either directly or by way of intervening structures. The system may also include a plurality of restrained pipe joints 38 each comprising a telescoping sleeve 23 accommodating two pipe ends. Such telescoping sleeves 23 are used to provide restrained joints 38, and can buffer the system against compression stresses. Examples of such restrained pipe joints 38 comprising a telescoping sleeve 23 are commercially available from the United States Pipe and Foundry Co., LLC (Birmingham, Ala., USA) under the trade names TR FLEX® and HP LOK®.

In some embodiments of the system 45 at least one of the plurality of pipe joints 1 comprises a second pipe 31 having a second weld bead, and the second pipe 31 is inserted into another of the plurality of pipe joints. This provides a series of highly separation-resistant joints along at least a portion of the system. Typically such second pipes 31 are 18-20' in axial length (549-610 cm). Accordingly, certain embodiments of the system 45 comprise one of the plurality of separation-resistant pipe joints 1 placed an average of about every 20' (610 cm), every 18' (549 cm), or an intermediate length along a line of pipe. The system 45 may comprise a low-friction polymer layer surrounding the components of the system. The polymer may be any suitable low-friction polymer, such as polyethylene or polyurethane. The layer may take the form of a bag that is placed around the components of the system during or before installation. It may also take the form a sheet that is wrapped around the components during or before installation. Additional forms of the layer, such as a coating or a barrier, are also contemplated.

E. Examples

A variety of compressible spacer 50 configurations and designs were tested to determine the extent to which they could withstand compressive forces when used with 6-inch ductile iron pipe. To test the ability of a compressible spacer 50 to withstand compressive forces, an apparatus with the following capabilities is required: applying a controlled rate of compression to a pipe joint 1, measuring the load applied to the pipe joint 1, and measuring the travel distance of the load applier. An example of such an apparatus, which was used to obtain the test results described below, is a Baldwin 200,000 lb capacity Universal Testing Machine, an ADMET® Precise Digital Controller (model PRSC-DA), and a Rectilinear Displacement Transducer (model PCB-450E). The Digital Controller may be linked to and calibrated with the Universal Testing Machine and the Transducer so that the Digital controller will display the load versus displacement. Optionally, a video recorder such as a Sony Handycam® (model HDR-PJ670) may be used to record the load and displacement so that the values may be later retrieved and manually entered into a computer to generate a load versus displacement curve.

To test a particular embodiment, the pipe joint 1 should be assembled with the desired compressible spacer 50 and the gasket 7 should be lubricated with a suitable gasket lubricant (such as TYTON® gasket lube) to reduce any friction caused by the gasket 7 to a negligible value. The non-joint ends of male 2 and female 3 joint members should be cut perpendicular to the axis of the pipe joint 1. The assembled joint 1 should then be placed between the contact surfaces of the Universal Testing Machine and the cross-head should be adjusted to make contact with the joint 1. The cross-head speed should be set to approximately 5/16 inch per minute, and if stress-strain data is desired, the strain indicator should be activated. The Universal Testing Machine should then be activated, and at appropriate time intervals, measurements for the compressive load applied, strain, and distance traveled should be recorded. The testing should continue until the cross-head reaches the desired end position, which may be when the raised stop 4 contacts the first constriction 5, or when the cross-head applies a maximum compressive force, which may be fraction of the compressive load capacity of the joint 1.

The following five working examples were tested to identify suitable compressible spacers 50 for use with 6-inch ductile iron pipe. For purposes of testing, compressible spacers 50 were designed to have an axial length of about 1 inch, which represents an intermediate position of the raised stop 4 being about 1 inch from the first constriction 5.

Working Example No. 1

In Working Example No. 1, a terminal compressible spacer 52 comprising polyvinyl chloride (PVC C900) was tested. The terminal spacer 52 comprised an arc of a ring having a cross section consisting essentially of a rectangular shape and having a radial width of about 0.54 inches. The first corner 75 of the terminal spacer 52 was contoured with a 0.25 inch chamfer. To ease insertion of the terminal compressible spacer 52 into the female joint member 3, the terminal compressible spacer 52 was saw-cut. After insertion, a small amount of material was wedged between the saw-cut so that the terminal compressible spacer 52 would maintain its position inside of the female joint member 3.

Figure 17:
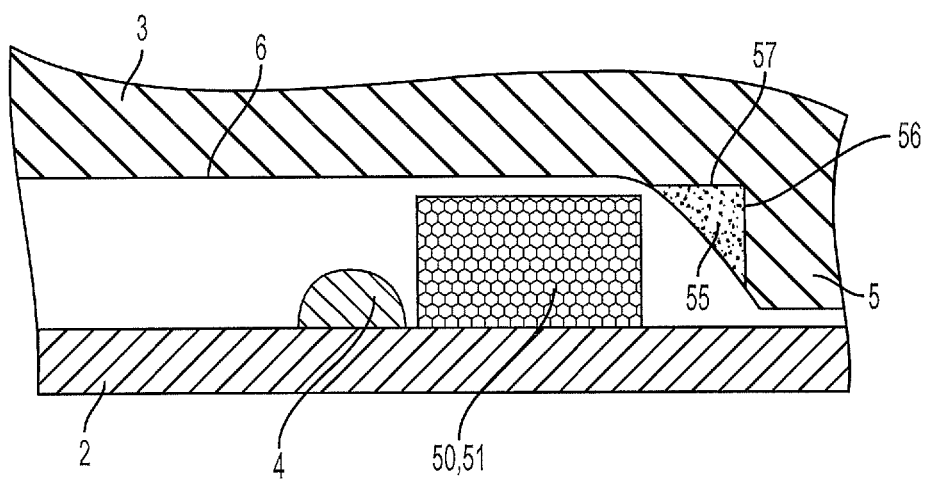
FIG. 17: An enhanced view of a cross section of an embodiment of the joint wherein the compressible spacer is an intermediate compressible spacer and the female joint member comprises a second circumferential groove.

Working Example No. 1 terminated full term, with the cross-head traveling 1 inch. A chart showing the displacement versus force is provided in FIG. 17. As can be seen in the chart, the terminal compressible spacer 52 experienced strain of less than 0.25 when a compressive force of about 80 Kips was applied to the joint 1, which is more than two times the digging force of most 30- to 40-ton excavators. In addition, the terminal compressible spacer 52 experienced a maximum compressive force of about 98 Kips. At the end of the test, technicians observed that the terminal compressible spacer 52 was still intact but extruded into the waterway. This behavior is believed to be desirable because inspectors may more easily detect joints 1 affected by an extreme event by using cameras to monitor the internal conduit of a system comprising a plurality of joints 1.

Working Example No. 2

In Working Example No. 2, an intermediate compressible spacer 51 comprising polyoxymethylene (acquired under the tradename Delrin®) was tested. The intermediate compressible spacer 51 was formed into a suitable shape by heating the material at approximately 350° F. to form a ring by wrapping the material around a 6-inch pipe spigot. After installation on the male joint member 2, there was a small gap in the intermediate compressible spacer 51 that measured approximately 0.63 inches. The cross section of the intermediate compressible spacer 51 consisted essentially of a rectangular shape, and the intermediate compressible spacer 51 had a radial width of about 0.25 inches.

Figure 18:
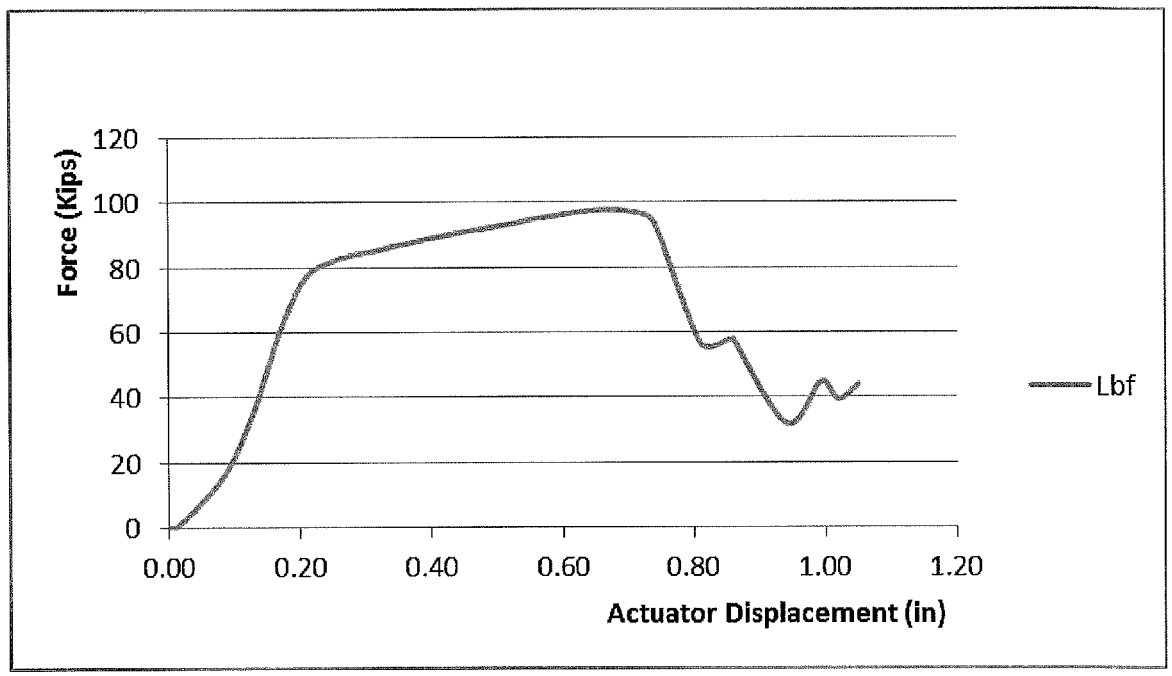
FIG. 18: A chart showing the displacement versus force using the terminal compressible spacer as described in Working Example No. 1.

Working Example No. 2 terminated full term, with the cross-head traveling 1 inch, FIG. 18 shows displacement versus load applied to the joint 1. The intermediate compressible spacer 51 experienced strain of less than 0.25 under a compressive force equal to about 40 Kips, which is slightly greater than the digging force associated with most 30- to 40-ton excavators. Although this resistance to compressive forces is believed to be sufficient to withstand the forces ordinarily associated with assembly, it is preferred that a compressible spacer 50 be able to withstand slightly greater forces. Furthermore, upon inspection after the test, it was discovered that the intermediate compressible spacer 51 extruded between the first constriction 5 and the male joint member 2 and into the gasket 7, which dislodged it from its retainer seat. The joint 1 was not further tested to determine whether the joint 1 would leak as a result of the dislodged gasket 7.

While the results of Working Example No. 2 were not as favorable as the results of Working Example No. 1, some minor modifications to the female joint member 3 and the intermediate compressible spacer 51 could improve the results to a more desirable level. For instance, the intermediate compressible spacer 51 could be designed so that there is no gap in the intermediate spacer 51, which should increase the ability of the intermediate compressible spacer 51 to withstand compressive forces. Alternatively or additionally, the female joint member 3 may comprise a second circumferential groove 55, as more fully described above. This embodiment would increase the surface area of the inner surface 6 contacted by the intermediate compressible spacer 51, thereby increasing the ability of the intermediate compressible spacer 51 to withstand compressive forces.

Working Example No. 3

In Working Example No. 3, a terminal compressible spacer 52 comprising polyvinyl chloride (PVC C900) was tested. The terminal spacer 52 was similar in design to the terminal spacer 52 used in Working Example No. 1, except that no material was wedged between the saw-cut of the terminal compressible spacer 52 in Working Example No. 3.

Figure 19:
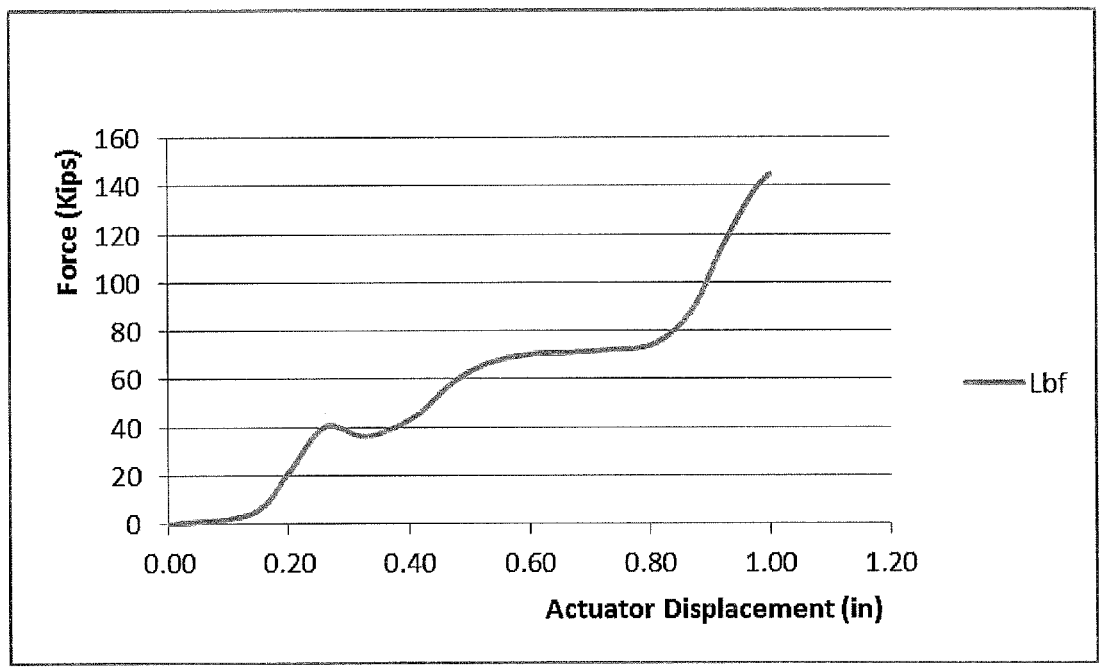
FIG. 19: A chart showing the displacement versus force using the intermediate compressible spacer as described in Working Example No. 2.

FIG. 19 displays the displacement versus load applied to the joint 1. As can be seen, Working Example No. 3 was terminated prematurely, which was due to a mistaken belief that the terminal compressible spacer 52 had become loose and was pushed beyond the second constriction of the female joint member 3. This test nonetheless confirms that a terminal compressible spacer 52 of this design experiences strain of less than 0.25 under a compressive force equal to about 80 Kips.

Working Example No. 4

In Working Example No. 4, an intermediate compressible spacer 51 comprising polyvinyl chloride (PVC C900) was tested. The intermediate spacer 51 comprised an arc of a ring having a cross section consisting essentially of a rectangular shape and having a radial width of about 0.25 inches. The distal edge of the intermediate compressible spacer 51 was contoured with a 0.25 inch radius, and the first corner 75 was beveled at 35°. The intermediate compressible spacer 51 was saw-cut to slide the intermediate spacer 51 over the male joint member 2 and against the raised stop 4.

Figure 20:
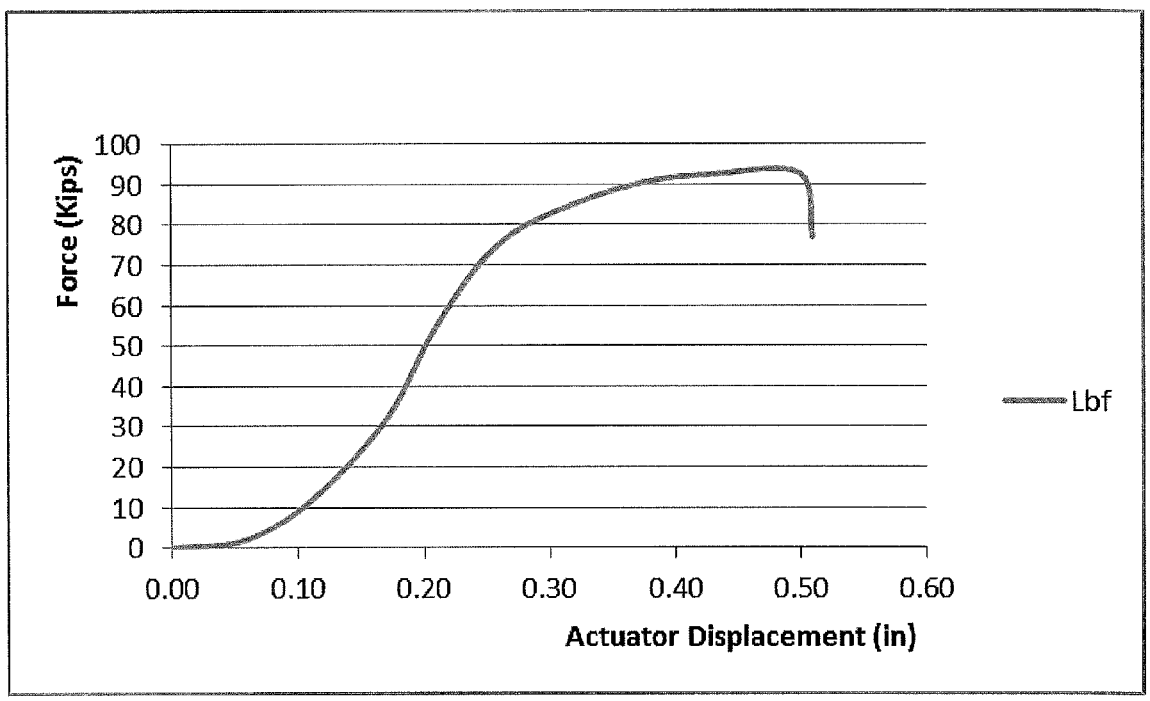
FIG. 20: A chart showing the displacement versus force using the terminal compressible spacer as described in Working Example No. 3.

Working Example No. 4 exhibited poor results. As can be seen from the FIG. 20, the intermediate compressible spacer 51 extruded very easily between the male joint member 2 and the first constriction 5 and extruded under the gasket 7. These poor test results are believed to be a combination of at least three factors: the location, the material, and the cross section. First, unlike the configuration in Working Example No. 1 (which used a similar material), the compressible spacer 50 in Working Example No. 4 was an intermediate compressible spacer 51, which may extrude under less force than a terminal compressible spacer 52. Second, the polyvinyl chloride material used in Working Example No. 4 is not as hard and extrudes easier than the polyoxymethylene material used in Working Example No. 2. And third, the cross section of the intermediate compressible spacer 51 had minimal surface area in contact with the inner surface 6 and the male joint member 2 such that the compressible spacer 51 more easily extruded.

Working Example No. 5

In Working Example No. 5, an intermediate compressible spacer 51 comprising polyetheretherketone (PEEK®) was tested. The intermediate spacer 51 was formed into an arc of a ring by applying a heat of approximately 375° F. and wrapping the material around a 6-inch pipe spigot. After installation on the male joint member 2, there was a small gap in the intermediate compressible spacer 51 that measured approximately 0.63 inches. The cross section of the intermediate compressible spacer 51 consisted essentially of a rectangular shape, and the intermediate compressible spacer 51 had a radial width of about 0.25 inches.

Figure 21:
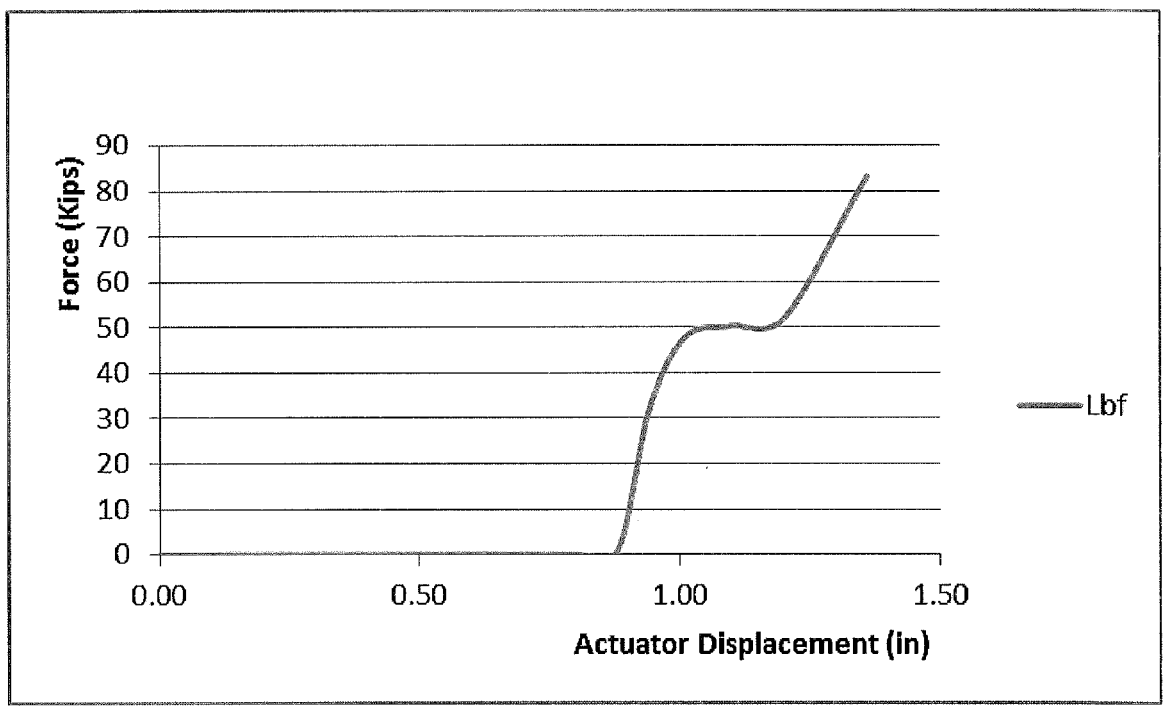
FIG. 21: A chart showing the displacement versus force using the intermediate compressible spacer as described in Working Example No. 4.
Figure 22:
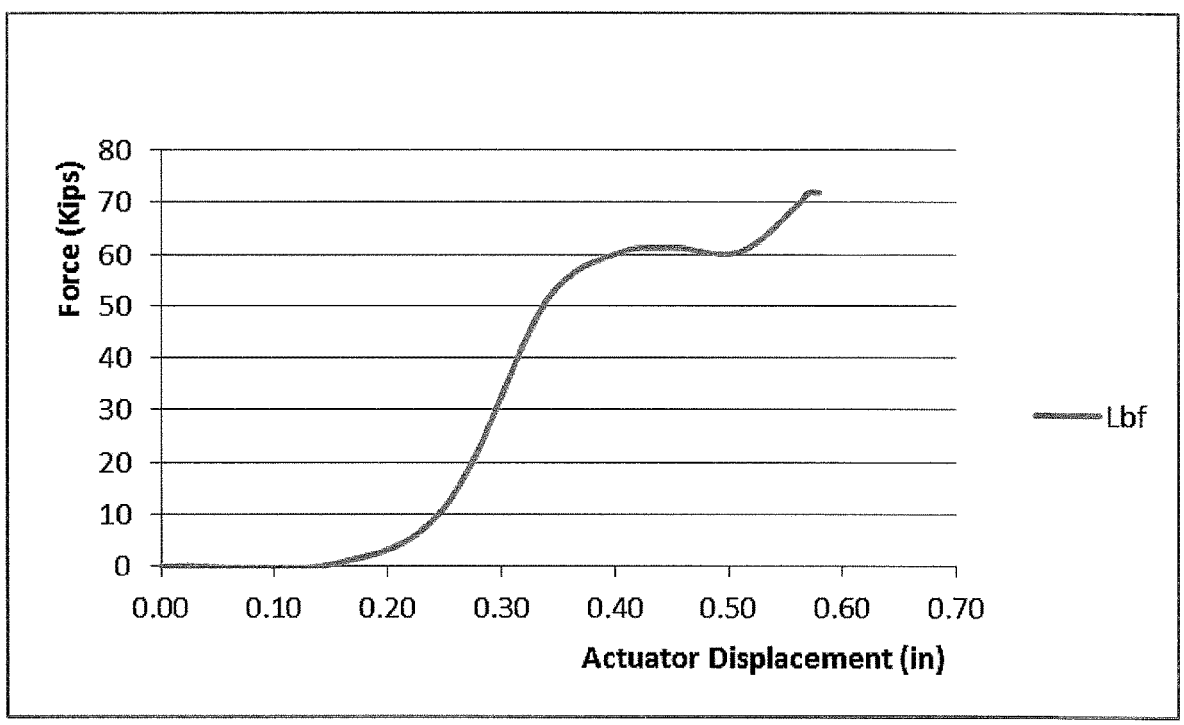
FIG. 22: A chart showing the displacement versus force using the intermediate compressible spacer as described in Working Example No. 5.

Working Example No. 5 was terminated early because of audible cracking sounds that are associated with the raised stop 4 shearing. FIG. 21 shows the displacement versus load applied to the joint 1. The intermediate compressible spacer 51 withstood compressive forces with relatively little displacement. Visual inspection of the compressible spacer 51 confirmed that the material exhibited little plasticity and experienced shear loading. This material was considered poor for use as an intermediate compressible spacer 51 because it may cause the raised stop 4 to fail before the intermediate compressible spacer 51. Instead of this behavior, it is desirable that the intermediate compressible spacer 51 fail before the raised stop 4 in extreme compressive events so that joint 1 may still survive the extreme event by allowing the male joint member to move in the compressive direction until the raised stop 4 contacts the first constriction 5.

F. Conclusions

It is to be understood that any given elements of the disclosed embodiments may be embodied in a single structure, a single step, a single substance, or the like. Similarly, a given element of a disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:
1. A separation-resistant pipe joint with enhanced ease of assembly comprising:
 (a) a female joint member, said female joint member comprising:
  i. an inner surface;
  ii. a first circumferential groove on the inner surface to accommodate a locking ring segment, said first circumferential groove having a shape consisting essentially of a frustum of an ellipsoid defined by two generally parallel planes each intersecting the ellipsoid;
  iii. a first constriction on the inner surface proximal to the first circumferential groove, the first constriction having a first constriction diameter;
  iv. an unobstructed traverse region between the first circumferential groove and the first constriction having a first regional diameter that is greater than the first constriction diameter;
  v. an unobstructed reverse taper region proximal to the first constriction, having a second regional diameter that is greater than or equal to the first constriction diameter and which increases in the proximal direction;
  vi. a second constriction on the inner surface proximal to the unobstructed reverse taper region, the second constriction having a second constriction diameter less than the first constriction diameter;
 (b) a male joint member inserted into the female joint member, the male joint member comprising an outer surface, a spigot mouth, and a raised stop on the outer surface positioned between the first circumferential groove and the first constriction, having a stop diameter greater than the first constriction diameter and less than the regional diameter; and
 (c) a compressible spacer selected from the group consisting of:
  i. an intermediate compressible spacer located between the raised stop and the first constriction, the intermediate compressible spacer positioned to contact the raised stop when the joint is compressed, and
  ii. a terminal compressible spacer located between the spigot mouth and the second constriction, the terminal compressible spacer positioned to contact the spigot mouth when the joint is compressed;
wherein the compressible spacer experiences strain of less than 0.25 under a compressive force of 33 Kip (147 kN).

2. The joint of claim 1, in which the compressible spacer is the intermediate compressible spacer, in which the female joint member comprises a second circumferential groove on the inner surface between the first circumferential groove and the first constriction.

3. The joint of claim 2, in which the second circumferential groove has a first surface approximately perpendicular to the axis of the female joint member.

4. The joint of claim 3, in which the compressible spacer has a proximal surface, the proximal surface being approximately perpendicular to the axis of the female joint member such that the proximal surface is flush with the first surface of the second circumferential groove when the joint is assembled.

5. The joint of claim 1, in which the compressible spacer is the intermediate compressible spacer, in which the intermediate compressible spacer has a radial width marginally less than half of the difference between the first regional diameter minus the outer diameter of the male joint member.

6. The joint of claim 1, in which the compressible spacer is the intermediate compressible spacer, in which the intermediate compressible spacer comprises an arc of a ring that has an inner spacer diameter marginally greater than the outside diameter of the male joint member.

7. The joint of claim 1, in which the compressible spacer is the intermediate compressible spacer, in which the intermediate compressible spaced is constructed of aluminum, and wherein the raised stop has a contact surface area available to engage the compressible spacer, in which the compressible spacer contacts less than half of the contact surface area.

8. The joint of claim 1, in which the compressible spacer comprises an arc of a ring, the ring having an outer surface, an inner surface, a proximal surface, and a distal surface, the ring having a cross section defined by intersecting the ring with a plane that contains the axis of the female joint member, the cross section consisting essentially of a rectangular shape formed by the outer surface, the inner surface, the proximal surface, and the distal surface.

9. The joint of claim 1, in which the compressible spacer has an axial length, wherein the ratio of the axial length and the distance from the first circumferential groove to the first constriction is about 33%.

10. The joint of claim 1, in which the compressible spacer is the terminal compressible spacer, wherein the unobstructed reverse taper region has a proximal diameter where the reverse taper region meets the second constriction, in which the terminal compressible spacer comprises an arc of a ring that has an outer diameter approximately equal to the proximal diameter.

11. The joint of claim 10, in which the compressible spacer is the terminal compressible spacer, in which the terminal compressible spacer has a radial width of no less than half of the difference between the proximal diameter and the inner diameter of the male joint member.

12. The joint of claim 1, in which the compressible spacer defines a circumferential arc of at least 340°.

13. The joint of claim 1, in which the compressible spacer has a radial width of about 0.25 inches (0.6 cm).

14. The joint of claim 1, in which the compressible spacer is biodegradable.

15. The joint of claim 1, in which the compressible spacer is dissolvable.

16. The joint of claim 1, in which the compressible spacer experiences strain of less than 0.25 under a compressive force of at least about 40 Kip (178 kN).

17. The joint of claim 1, in which the compressible spacer experiences strain of less than 0.25 under a compressive force equal to at least the maximum force of a piece of excavating equipment used for assembly of the joint.

18. The joint of claim 17, where the machine is 30-40 ton excavator.

19. The joint of claim 1 wherein the compressible spacer experiences strain of at least 0.5 under a compressive force of F, wherein $$F = \sigma \times \pi \times (R-t)^2, \text{ wherein}$$

$\sigma$ = the proportional limit of the material of which the male joint member is constructed;

R = the minimum outer radius of the male joint member; and t = the minimum thickness of the male joint member.

* * * * *